(12) United States Patent
Kinjo et al.

(10) Patent No.: US 12,411,572 B2
(45) Date of Patent: Sep. 9, 2025

(54) DETECTION DEVICE

(71) Applicant: Magnolia White Corporation, Tokyo (JP)

(72) Inventors: Hiroumi Kinjo, Tokyo (JP); Masatomo Hishinuma, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/486,210

(22) Filed: Oct. 13, 2023

(65) Prior Publication Data

US 2024/0126391 A1    Apr. 18, 2024

(30) Foreign Application Priority Data

Oct. 13, 2022    (JP) .................. 2022-164571

(51) Int. Cl.
*G06F 3/041*    (2006.01)
*G06F 3/042*    (2006.01)
*G06F 3/044*    (2006.01)

(52) U.S. Cl.
CPC ........ *G06F 3/04164* (2019.05); *G06F 3/0421* (2013.01); *G06F 3/0447* (2019.05)

(58) Field of Classification Search
CPC ... G06F 3/04164; G06F 3/0421; G06F 3/0447
See application file for complete search history.

(56) References Cited

U.S. PATENT DOCUMENTS

| | | | |
|---|---|---|---|
| 2016/0174304 A1 | 6/2016 | Kim et al. | |
| 2019/0014664 A1* | 1/2019 | Ahn | ...................... H10K 59/40 |
| 2019/0319052 A1* | 10/2019 | Yoshida | ............... G06F 3/04164 |
| 2020/0103991 A1* | 4/2020 | Nie | ...................... G02F 1/13338 |
| 2020/0104012 A1* | 4/2020 | Du | ........................ G06F 3/0445 |
| 2020/0278587 A1* | 9/2020 | Fukami | ................. H01L 27/124 |

(Continued)

FOREIGN PATENT DOCUMENTS

| | | |
|---|---|---|
| JP | 2018-146489 A | 9/2018 |
| JP | 2019-029514 A | 2/2019 |
| JP | 2021-103298 A | 7/2021 |

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*

*Primary Examiner* — Jeff Piziali
(74) *Attorney, Agent, or Firm* — XSENSUS LLP

(57) ABSTRACT

A detection device includes a substrate having a detection region, a coupling region, and a wiring region between the detection region and the coupling region, a plurality of detection elements disposed in the detection region of the substrate, a plurality of terminals disposed in the coupling region of the substrate and electrically coupled to the detection elements, a plurality of coupling wires adjacently disposed with a gap interposed therebetween in the wiring region of the substrate and electrically coupling the detection elements to the terminals, an insulating layer provided to the wiring region of the substrate and covering the coupling wires, and a plurality of through holes formed in the wiring region of the substrate and passing through the substrate and the insulating layer in a thickness direction between the coupling wires.

14 Claims, 22 Drawing Sheets

(56) References Cited

U.S. PATENT DOCUMENTS

| | | | |
|---|---|---|---|
| 2021/0096416 A1* | 4/2021 | Koide | G02F 1/13452 |
| 2021/0096720 A1* | 4/2021 | Seomoon | G06F 3/0416 |
| 2021/0120324 A1* | 4/2021 | Seo | H04R 3/00 |
| 2021/0192988 A1 | 6/2021 | Kim et al. | |
| 2021/0294475 A1* | 9/2021 | Lee | G06F 1/1652 |
| 2021/0349363 A1* | 11/2021 | Huang | G06F 3/04164 |

* cited by examiner

FIG.29
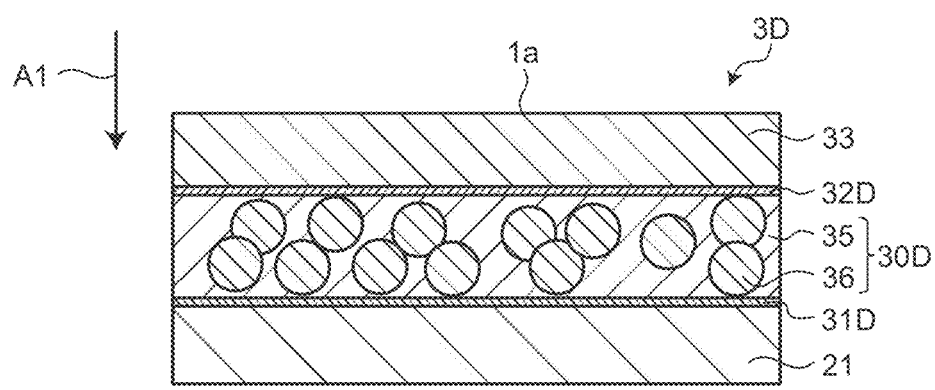
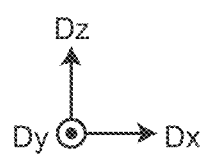

DETECTION DEVICE

CROSS-REFERENCE TO RELATED APPLICATION

This application claims the benefit of priority from Japanese Patent Application No. 2022-164571 filed on Oct. 13, 2022, the entire contents of which are incorporated herein by reference.

BACKGROUND

1. Technical Field

The present invention relates to a detection device.

2. Description of the Related Art

Japanese Patent Application Laid-open Publication No. 2019-029514 (JP-A-2019-029514) describes a wiring device including a rigid substrate, a stretchable substrate stacked on the rigid substrate, and stretchable wiring provided on the stretchable substrate. The wiring device described in JP-A-2019-029514 is used in strain sensors. Japanese Patent Application Laid-open Publication No. 2021-103298 (JP-A-2021-103298) describes a stretchable display device that can display images when warped or stretched. U.S. Unexamined Patent Application Publication No. 2016/0174304 (US 2016/0174304 A1) describes an OLED display device with a bendable region.

Japanese Patent Application Laid-open Publication No. 2018-146489 (JP-A-2018-146489) describes a force sensor including a plurality of electrodes spaced apart from each other.

In JP-A-2019-029514, JP-A-2021-103298, and US 2016/0174304 A1, a deformable part (e.g., stretchable substrate) and a non-deformable part (e.g., rigid substrate) are coupled. Stress may possibly be generated due to the state of deformation of the deformable part, thereby breaking the wiring. Alternatively, stress may possibly increase due to the state of coupling between the deformable part and the non-deformable part, thereby breaking the wiring.

There is a demand for a detection device, such as the force sensor described in JP-A-2018-146489, to be attached to a member having a curved surface and detect the physical quantity, such as force. In this case, stress may possibly act on coupling wires extending from a plurality of force sensors, thereby breaking the wiring.

An object of the present invention is to provide a detection device that can suppress breaking of a plurality of wires electrically coupled to a plurality of detection elements.

SUMMARY

A detection device according to an embodiment of the present disclosure includes a substrate having a detection region, a coupling region, and a wiring region between the detection region and the coupling region, a plurality of detection elements disposed in the detection region of the substrate, a plurality of terminals disposed in the coupling region of the substrate and electrically coupled to the detection elements, a plurality of coupling wires adjacently disposed with a gap interposed therebetween in the wiring region of the substrate and electrically coupling the detection elements to the terminals, an insulating layer provided to the wiring region of the substrate and covering the coupling wires, and a plurality of through holes formed in the wiring region of the substrate and passing through the substrate and the insulating layer in a thickness direction between the coupling wires.

BRIEF DESCRIPTION OF THE DRAWINGS

FIG. 29 is a sectional view of the force sensor according to the sixteenth modification after force is input.

DETAILED DESCRIPTION

Figure 1:
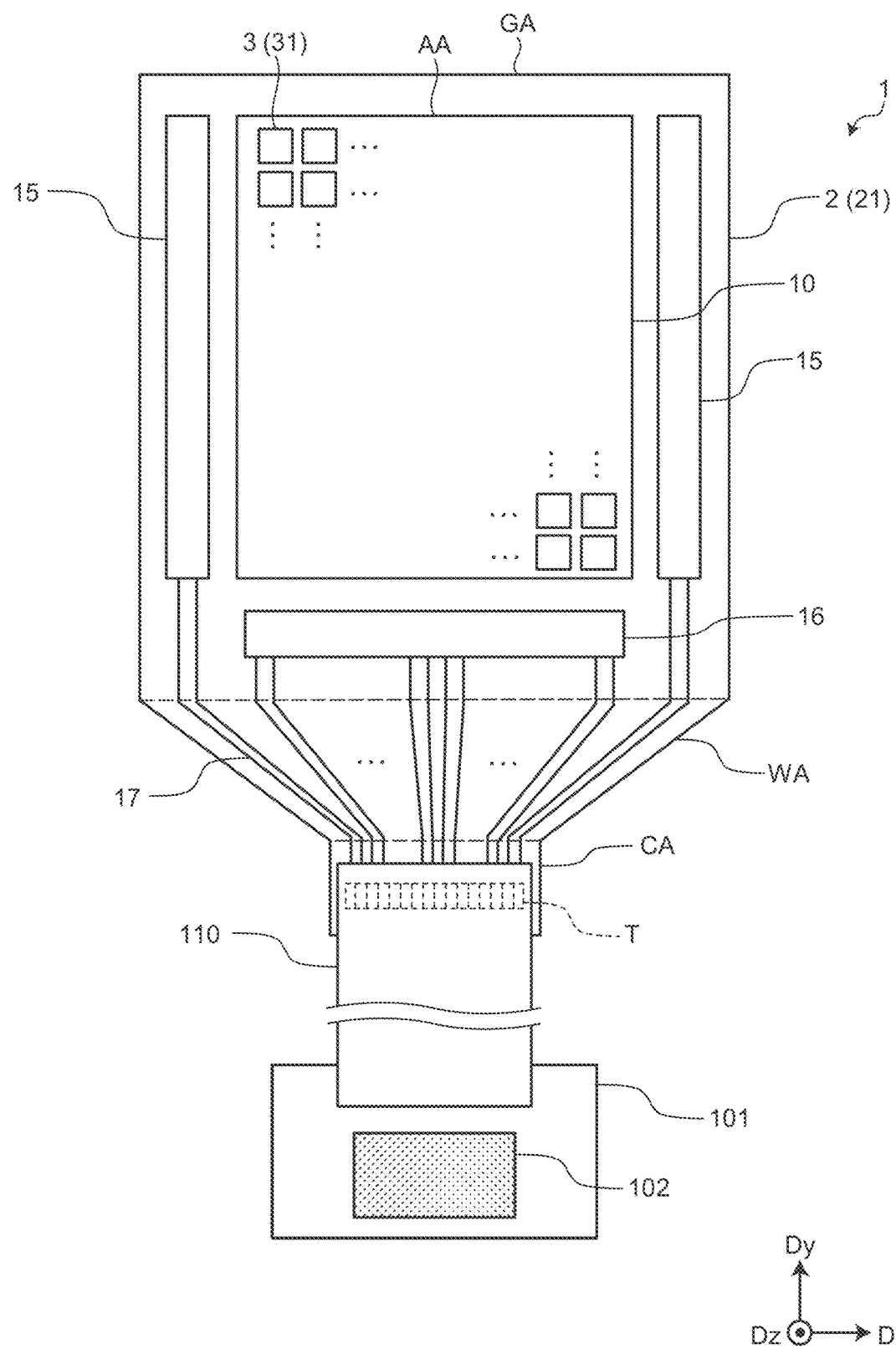
FIG. 1 is a plan view schematically illustrating a detection device according to a first embodiment.

Exemplary aspects (embodiments) to embody the present invention are described below in greater detail with reference to the accompanying drawings. The contents described in the embodiments below are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the present disclosure. To simplify the explanation, the drawings may possibly illustrate the width, the thickness, the shape, and other elements of each unit more schematically than those in the actual aspect. These elements, however, are given by way of example only and are not intended to limit interpretation of the present disclosure. In the present disclosure and the drawings, components similar to those previously described with reference to previous drawings are denoted by like reference numerals, and detailed explanation thereof may be appropriately omitted.

To describe an aspect regarding a certain structure on which another structure is disposed in the present specification and the claims, when "on" is simply used, it indicates both the following cases unless otherwise noted: a case where the other structure is disposed directly on and in contact with the certain structure, and a case where the other structure is disposed on the certain structure with yet another structure interposed therebetween.

First Embodiment

FIG. 1 is a plan view schematically illustrating a detection device according to a first embodiment. A detection device 1 according to the first embodiment is a force sensor that detects force acting on an input surface 1a (refer to FIG. 6). As illustrated in FIG. 1, the detection device 1 includes an array substrate 2 (substrate 21), a sensor unit 10, a gate line drive circuit 15, a signal line selection circuit 16, a wiring substrate 110, a control substrate 101, and a drive integrated circuit (IC) 102.

The control substrate 101 is electrically coupled to the substrate 21 via the wiring substrate 110. The wiring substrate 110 is a flexible printed circuit board or a rigid board, for example. The control substrate 101 is provided with the drive IC 102. The drive IC 102 supplies control signals to the sensor unit 10, the gate line drive circuit 15, and the signal line selection circuit 16 to control the detection operation of the sensor unit 10. The drive IC 102 may include a drive circuit that supplies voltage signals, such as power signals, to the sensor unit and the gate line drive circuit 15. The drive IC 102 may include a detection circuit that receives detection signals output from a plurality of force sensors 3 and performs signal processing on the detection signals.

The substrate 21 has a detection region AA, a peripheral region GA, a wiring region WA, and a coupling region CA. The detection region AA is a region provided with the plurality of force sensors 3. The peripheral region GA is a region between the outer periphery of the detection region AA and the outer periphery of the substrate 21 and is not provided with the force sensors 3. The gate line drive circuit 15 and the signal line selection circuit 16 are provided in the peripheral region GA of the substrate 21. In the example illustrated in FIG. 1, the peripheral region GA has a frame shape surrounding the detection region AA.

In the following description, a first direction Dx is a direction in a plane parallel to the substrate 21. A second direction Dy is a direction in the plane parallel to the substrate 21 and is orthogonal to the first direction Dx. The second direction Dy may intersect the first direction Dx without being orthogonal thereto. A third direction Dz is a direction orthogonal to the first direction Dx and the second direction Dy. The third direction Dz is the normal direction of the substrate 21. The term "plan view" refers to the positional relation when viewed from a direction perpendicular to the substrate 21.

The force sensors 3 (detection elements) are arrayed in a matrix (row-column configuration) in the detection region AA. In other words, the force sensors 3 are arrayed in the first direction Dx and the second direction Dy in the detection region AA. The force sensors 3 of the sensor unit 10 are devices that detect force input to a plurality of individual detection regions obtained by dividing the detection region AA. The force sensors 3 output detection signals Vdet corresponding to the force input to them. The force sensors 3 perform detection due to gate drive signals supplied from the gate line drive circuit 15. The force sensors 3 output electrical signals corresponding to the force input to them as detection signals Vdet to the signal line selection circuit 16. The configuration of the force sensor 3 will be described later in greater detail with reference to FIG. 6.

The gate line drive circuit 15 is a circuit that drives a plurality of gate lines GL (refer to FIG. 5) based on control signals supplied from the drive IC 102. The gate line drive circuit 15 sequentially or simultaneously selects a plurality of gate lines GL and supplies gate drive signals to the selected gate lines GL. Thus, the gate line drive circuit 15 selects the plurality of force sensors 3 coupled to the gate lines GL.

Figure 5:
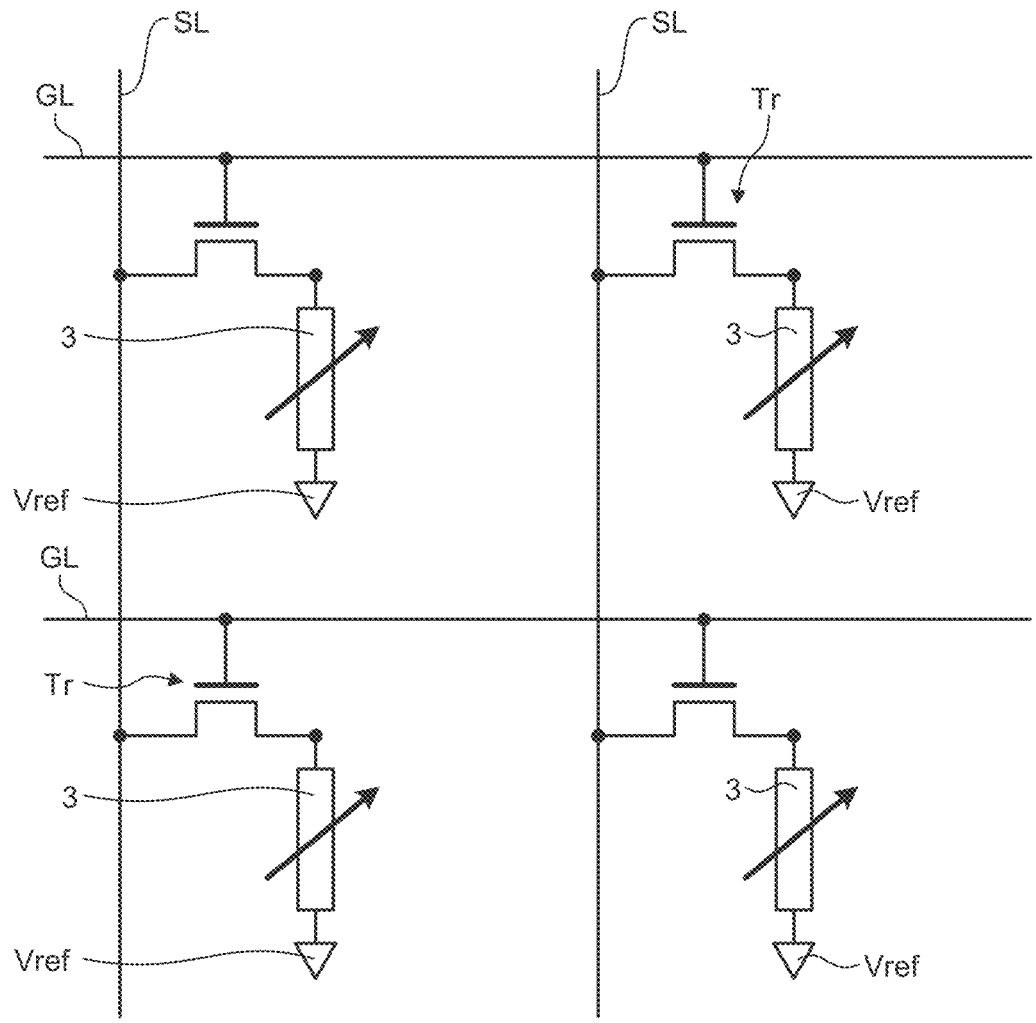
FIG. 5 is a circuit diagram of the circuit configuration of force sensors according to the first embodiment.

The signal line selection circuit 16 is a switch circuit that sequentially or simultaneously selects a plurality of signal lines SL (refer to FIG. 5). The signal line selection circuit 16 is a multiplexer, for example. The signal line selection circuit 16 selects the signal lines SL based on selection signals supplied from the drive IC 102. As a result, the signal line selection circuit 16 electrically couples the force sensors 3 coupled to the selected signal lines SL to a coupling wire 17. Thus, the detection signals Vdet from the force sensors 3 are output to the drive IC 102 via the coupling wire 17 and the wiring substrate 110.

The detection region AA, the peripheral region GA, the wiring region WA, and the coupling region CA are adjacently positioned in the second direction Dy. The coupling region CA of the substrate 21 is provided with a plurality of terminals T electrically coupled to the force sensors 3 via the signal line selection circuit 16 and the coupling wire 17. The coupling region CA of the substrate 21 is coupled to the wiring substrate 110 via the terminals T. The width of the coupling region CA in the first direction Dx is smaller than that of the detection region AA and the peripheral region GA in the first direction Dx.

The wiring region WA is positioned between the detection region AA and the coupling region CA in the second direction Dy. The wiring region WA is provided with a plurality of coupling wires 17 that electrically couple the force sensors 3 to the terminals T. In FIG. 1, the boundary between the wiring region WA, and the detection region AA and the peripheral region GA is virtually represented by an alternate long and short dash line. The boundary between the wiring region WA and the coupling region CA is virtually represented by an alternate long and short dash line. In the example illustrated in FIG. 1, the wiring region WA has a trapezoidal shape with a long side on the detection region AA side and the peripheral region GA side and a short side on the coupling region CA side. The configuration of the wiring region WA will be described later in greater detail with reference to FIG. 9.

Figure 2:
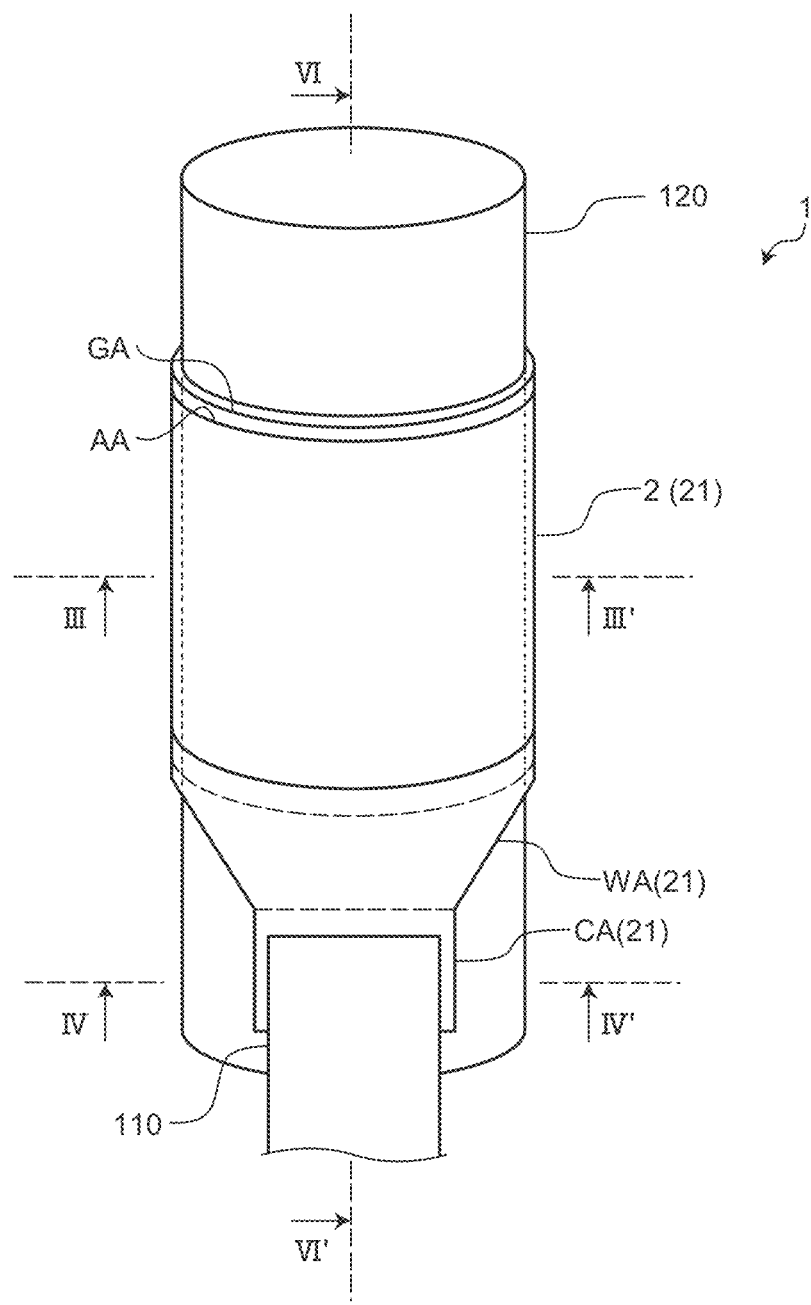
FIG. 2 is a view for explaining an example of the use of the detection device according to the first embodiment.
Figure 3:
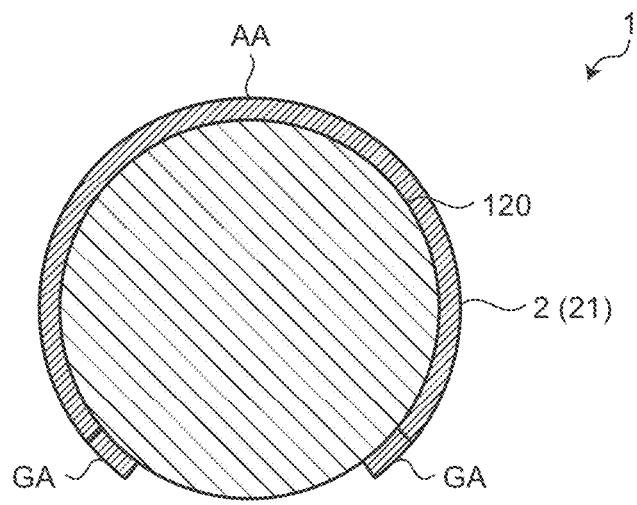
FIG. 3 is a sectional view along line III-III' of FIG. 2.
Figure 4:
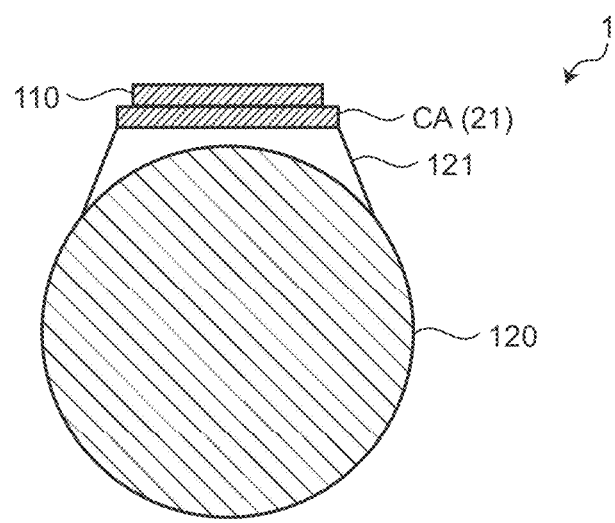
FIG. 4 is a sectional view along line IV-IV' of FIG. 2.

FIG. 2 is a view for explaining an example of the use of the detection device according to the first embodiment. FIG. 3 is a sectional view along line III-III' of FIG. 2. FIG. 4 is a sectional view along line IV-IV' of FIG. 2. As illustrated in FIGS. 2 to 4, the detection device 1 according to the first embodiment is used by being wrapped around the outer peripheral surface of a housing 120. The housing 120 has a solid columnar shape with a curved outer peripheral surface. The housing 120, however, does not necessarily have a columnar shape and may at least partially have a curved surface. The housing 120 is a handrail of stairs or a grip of sports equipment or a directional training machine, for example. The detection device 1 detects the magnitude and the distribution of force applied when a user grips the housing 120.

More specifically, as illustrated in FIG. 3, the detection region AA and the peripheral region GA of the substrate 21 are provided to the curved surface of the housing 120 and are attached in a curved state along the outer peripheral surface. The substrate 21 is attached to the housing 120 by adhesive or double-sided tape, which is not illustrated. The detection device 1 is disposed with the second direction Dy in FIG. 1 along the extending direction (axial direction) of the housing 120 and with the first direction Dx in FIG. 1 along the circumferential direction of the housing 120. The third direction Dz (normal direction of the substrate 21) in FIG. 1 of the detection device 1 corresponds to the radial direction of the housing 120.

As illustrated in FIG. 4, the outer peripheral surface of the housing 120 is provided with a base 121. The coupling region CA of the substrate 21 is attached on the flat surface of the base 121 of the housing 120. With this configuration, the coupling region CA is provided to the outer peripheral surface of the housing 120 in a flat state, thereby securing satisfactory coupling with the wiring substrate 110.

As illustrated in FIG. 2, the wiring region WA of the substrate 21 is deformed to couple the detection region AA and the peripheral region GA in a curved state to the coupling region CA in a flat state. The side of the wiring region WA on the detection region AA side is curved along the outer peripheral surface of the housing 120. The side of the wiring region WA on the coupling region CA side is flat along the flat surface of the base 121.

The housing 120 illustrated in FIGS. 2 to 4 is given by way of example only, and the housing 120 may have a conical shape, for example. The detection device 1 is not necessarily attached to the outer peripheral surface of the housing 120 and may be attached to housings with other shapes. For example, the detection device 1 is not necessarily attached to a convex curved surface and may be attached to a concave curved surface. While FIGS. 1 to 4 illustrate an example where the wiring substrate 110 is coupled to the coupling region CA of the substrate 21, the present embodiment is not limited thereto. Alternatively, the drive IC 102 may be mounted on the coupling region CA of the substrate 21.

The following describes an example of the circuit configuration and the operation of the detection device 1. FIG. 5 is a circuit diagram of the circuit configuration of the force sensors according to the first embodiment. As illustrated in FIG. 5, the gate lines GL each extend in the first direction Dx and are arrayed in the second direction Dy. The signal lines SL each extend in the second direction Dy and are arrayed in the first direction Dx. The detection device 1 also includes common wiring, which is not specifically illustrated, extending along the peripheral region GA. The common wiring is supplied with a reference potential Vref from the drive IC 102.

A drive transistor Tr is provided corresponding to each of the force sensors 3. The drive transistor Tr is composed of a thin-film transistor (TFT) and is an re-channel metal oxide semiconductor (MOS) TFT in this example.

The gate of the drive transistor Tr is coupled to the gate line GL. The source (source electrode 52 (refer to FIG. 6)) of the drive transistor Tr is coupled to the force sensor 3. The drain (drain electrode 53 (refer to FIG. 6)) of the drive transistor Tr is coupled to the signal line SL.

With this configuration, when the gate line drive circuit 15 scans the gate line GL, the detection signals Vdet corresponding to the force input to the force sensors 3 are obtained via the signal lines SL. As a result, the values of force acting on the individual detection regions corresponding to the respective force sensors 3 are obtained based on the magnitude of the detection signals Vdet obtained via the signal lines SL.

The drive transistor Tr is not limited to an n-type TFT and may be a p-type TFT. A plurality of transistors may be provided corresponding to one force sensor 3.

Figure 6:
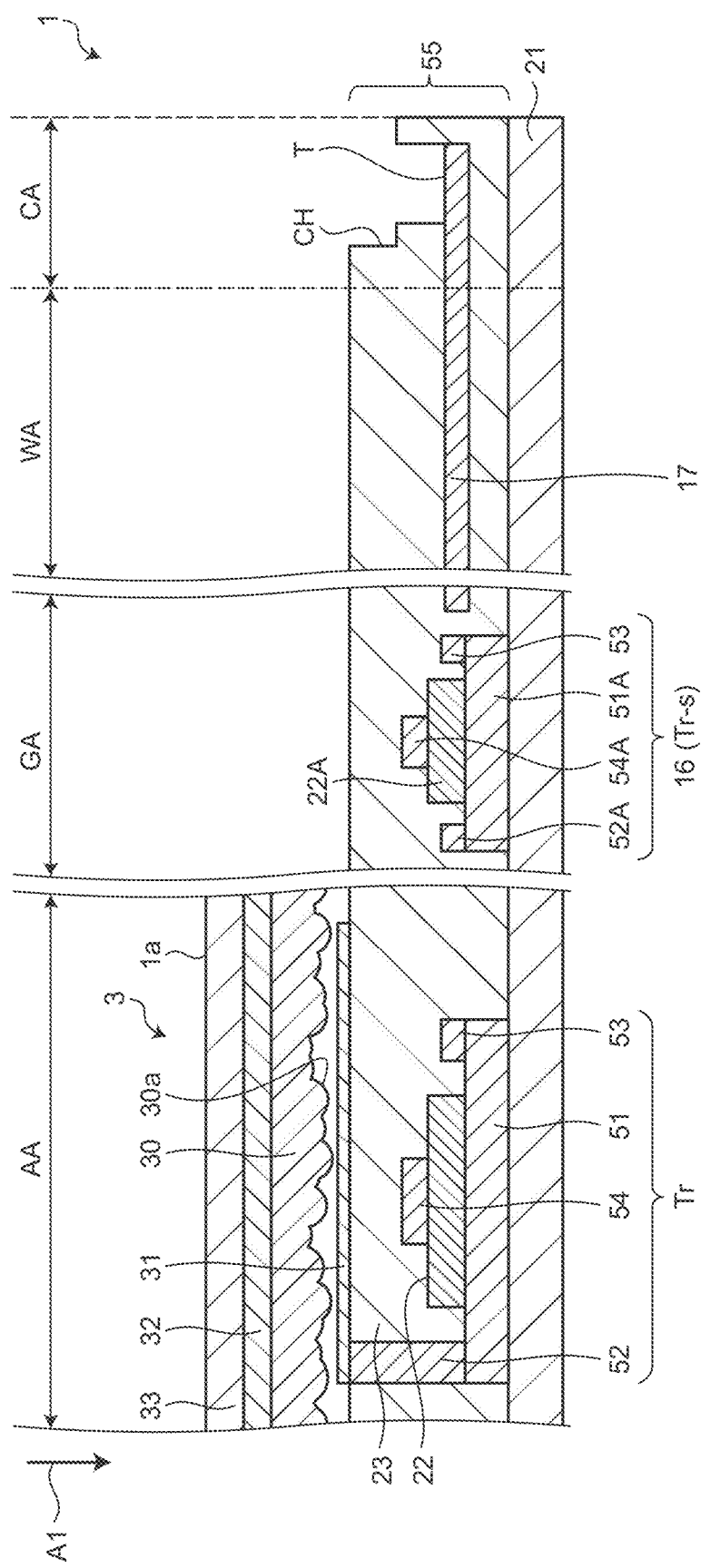
FIG. 6 is a sectional view along line VI-VI' of FIG. 2.

The following describes the multilayered configuration of the detection device 1. FIG. 6 is a sectional view along line VI-VI' of FIG. 2. In the following description, a force direction A1 may be referred to as "the lower side" or simply as "under", and the direction opposite to the force direction A1 may be referred to as "the upper side" or simply as "on".

As illustrated in FIG. 6, the detection region AA, the peripheral region GA, the wiring region WA, and the coupling region AA include the substrate 21 and a circuit layer 55 extending continuously and shared by them. The substrate 21 is an insulating and flexible substrate. The substrate 21 is made of a resin substrate or a resin film, for example. The circuit layer 55 is composed of circuit elements, such as the drive transistor Tr, various kinds of wiring coupled to the circuit elements, gate insulating films 22 and 22A, and an insulating layer 23.

In the detection region AA, the drive transistor Tr, the insulating layer 23, the force sensor 3, and a protective layer 33 are stacked on the substrate 21. In the peripheral region GA, a transistor Tr-S and the insulating layer 23 are provided on the substrate 21. In other words, the force sensor 3 is not formed on the insulating layer 23 in the peripheral region GA. The transistor Tr-S in the peripheral region GA is a transistor that constitutes a peripheral circuit, such as the signal line selection circuit 16, and is a switching element that switches coupling and decoupling between the signal lines SL and the coupling wire 17, for example.

In the wiring region WA and the coupling region CA, the coupling wire 17 and the insulating layer 23 are provided on the substrate 21. The substrate 21 and the insulating layer 23 in the wiring region WA and the coupling region CA are formed continuously with and made of the same material as that of the substrate 21 and the insulating layer 23 in the detection region AA and the peripheral region GA.

The coupling wire 17 is continuously provided from the peripheral region GA to the wiring region WA and the coupling region CA. The coupling wire 17 electrically couples the force sensors 3 (detection elements) to the terminals T. Specifically, one end of the coupling wire 17 is coupled to the signal line selection circuit 16 (transistor Tr-S) in the peripheral region GA and is electrically coupled to the force sensor 3 via the signal line selection circuit 16 (transistor Tr-S) and the signal line SL. In the coupling region CA, a contact hole CH is formed in the region of the insulating layer 23 overlapping the coupling wire 17. The terminal T in the coupling region CA is formed by the coupling wire 17 exposed at the bottom of the contact hole CH.

In the detection region AA, the drive transistor Tr includes a semiconductor layer 51, a source electrode 52, a drain electrode 53, and a gate electrode 54. The semiconductor layer 51 is provided on the substrate 21. The gate electrode 54 is provided on the semiconductor layer 51 with the gate insulating film 22 interposed therebetween. The source electrode 52 is coupled to the source region of the semiconductor layer 51. The source electrode 52 is electrically coupled to a detection electrode 31 of the force sensor 3 through a contact hole formed in the insulating layer 23. The drain electrode 53 is coupled to the drain region of the semiconductor layer 51. The drain electrode 53 is electrically coupled to the signal line SL (refer to FIG. 5).

Similarly to the drive transistor Tr, the transistor Tr-S in the peripheral region GA includes a semiconductor layer 51A, a source electrode 52A, a drain electrode 53A, and a gate electrode 54A. The gate electrode 54A is provided on the semiconductor layer 51A with the gate insulating film 22A interposed therebetween. The multilayered structure of the transistor Tr-S is the same as that of the drive transistor Tr described above, and repeated explanation thereof is omitted.

The insulating layer 23 is provided on the substrate 21 to cover the drive transistor Tr. The insulating layer 23 covers the drive transistor Tr in the detection region AA and is continuously provided to the peripheral region GA, the wiring region WA, and the coupling region AA as described above. While FIG. 6 illustrates only two insulating layers of the gate insulating film 22 and the insulating layer 23 as the insulating layers of the circuit layer 55 to simplify the explanation, three or more insulating layers may be stacked.

The force sensor 3 is provided on the insulating layer 23 of the circuit layer 55. The force sensor 3 includes a sensor layer 30, the detection electrode 31, and a common electrode 32. The detection electrode 31 is provided on the insulating layer 23. The detection electrode 31 is made of conductive metal material. Alternatively, the detection electrode 31 may be made of translucent conductive material, such as indium tin oxide (ITO). The detection electrodes 31 are separated from each other corresponding to the respective force sensors 3. In other words, the detection electrodes 31 are arrayed in a matrix (row-column configuration) in the detection region AA (refer to FIG. 1).

The common electrode 32 is disposed facing the detection electrodes 31. The common electrode 32 is a solid film formed on the lower surface of the protective layer 33. In other words, the common electrode 32 overlaps the entire detection region AA and is shared by the force sensors 3. The common electrode 32 is made of conductive metal material. Alternatively, the common electrode 32 may be made of translucent conductive material, such as ITO. The common electrode 32 is coupled to common wiring (not illustrated) by wiring, which is not illustrated, and is supplied with the reference potential Vref from the drive IC 102.

The sensor layer 30 is provided between the detection electrode 31 and the common electrode 32. The sensor layer according to the present embodiment is provided on the lower surface (surface facing the detection electrode 31) of the common electrode 32. The sensor layer 30 overlaps the entire detection region AA. The sensor layer 30 is made of conductive resin. The sensor layer 30 has a plurality of protrusions 30a on the lower surface (surface facing the detection electrode 31). Each protrusion 30a is separated from the detection electrode 31 and the insulating layer 23 with a space interposed therebetween when no force is applied to the input surface 1a.

The protective layer 33 is provided covering the common electrode 32. The upper surface of the protective layer 33 serves as the input surface 1a of the detection device 1. Similarly to the substrate 21, the protective layer 33 is an insulating and flexible substrate. The protective layer 33 is made of a resin substrate or a resin film, for example.

Figure 7:
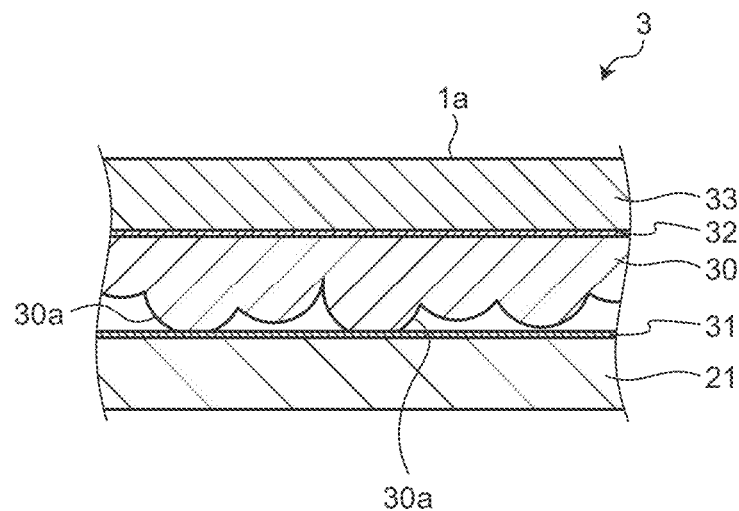
FIG. 7 is a sectional view of the force sensor according to the first embodiment before force is input.
Figure 8:
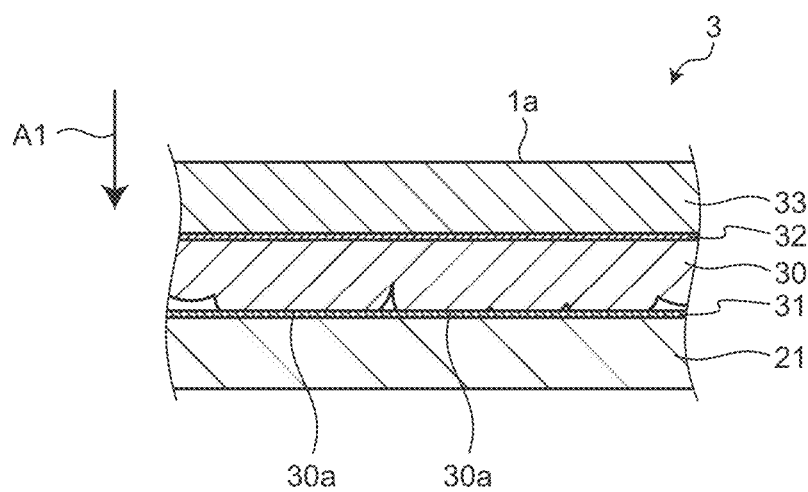
FIG. 8 is a sectional view of the force sensor according to the first embodiment after force is input.

FIG. 7 is a sectional view of the force sensor according to the first embodiment before force is input. FIG. 8 is a sectional view of the force sensor according to the first embodiment after force is input. FIGS. 7 and 8 do not illustrate the circuit layer 55. As illustrated in FIG. 7, some of the protrusions 30a are in contact with the detection electrode 31 before force is input. However, the number of protrusions 30a in contact with the detection electrode 31 is small, and the detection electrode 31 and the common electrode 32 facing across the sensor layer 30 remain insulated. FIG. 7 is given by way of example only, and the protrusions 30a may be separated from and not in contact with the detection electrode 31 before force is input.

When the input surface 1a of the force sensor 3 is pressed, the protective layer 33 and the common electrode 32 deform and come closer to the detection electrode 31. The sensor layer 30 moves in the force direction A1, and the protrusions 30a of the sensor layer 30 come into contact with the detection electrode 31. As a result, the detection electrode 31 and the common electrode 32 are electrically coupled via the sensor layer 30, and an electric current flows to the detection electrode 31.

As the force acting on the sensor layer 30 increases, the number of protrusions 30a in contact with the detection electrode 31 increases, and the contact area between the sensor layer 30 and the detection electrode 31 increases. In addition, the protrusions 30a are pressed against and planarized on the detection electrode 31, thereby increasing the contact area with the detection electrode 31. For this reason, the contact resistance between the sensor layer 30 and the detection electrode 31 decreases corresponding to an increase in force (increase in contact area), and the amount of electric current flowing to the detection electrode 31 increases. Therefore, the force sensor 3 can detect the force value based on the magnitude of the current value.

Figure 9:
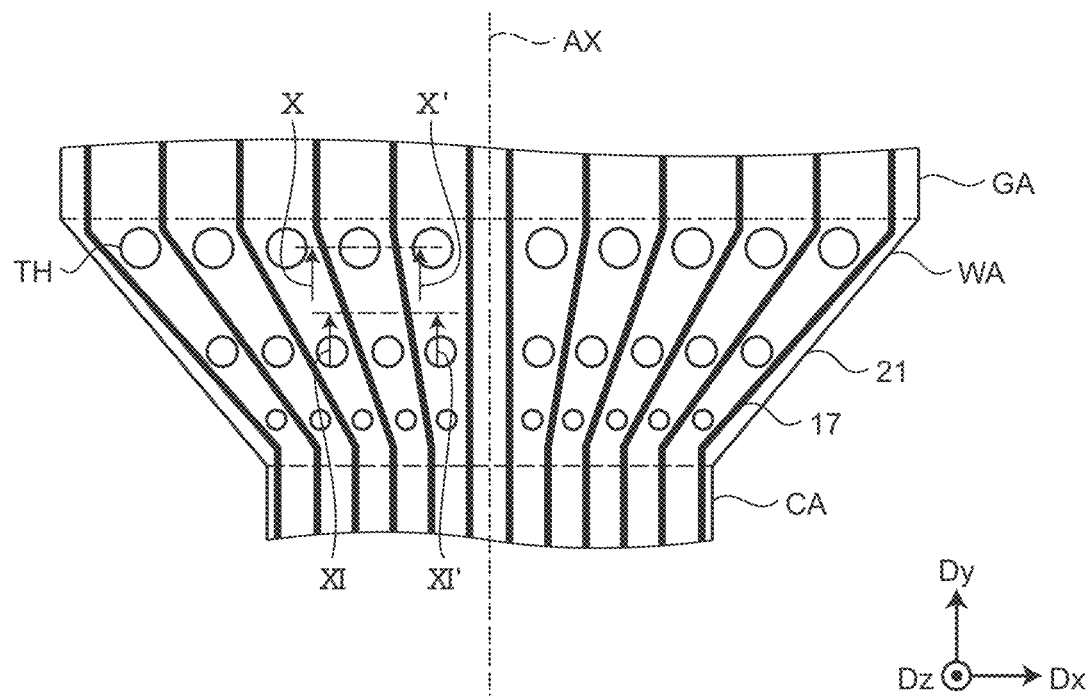
FIG. 9 is an enlarged plan view of a wiring region of the detection device according to the first embodiment.
Figure 10:
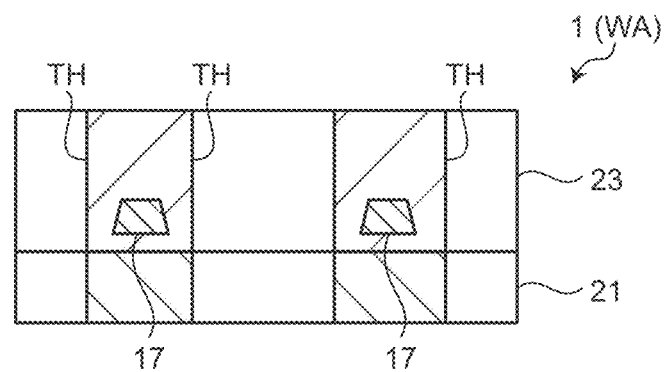
FIG. 10 is a sectional view along line X-X' of FIG. 9.
Figure 11:
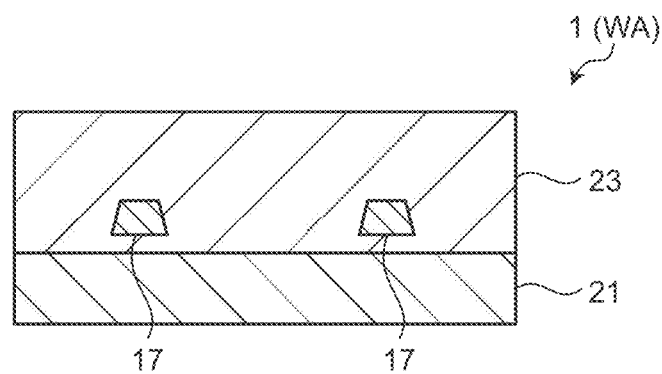
FIG. 11 is a sectional view along line XI-XI' of FIG. 9.

The following describes the configuration of the wiring region WA in greater detail. FIG. 9 is an enlarged plan view of the wiring region of the detection device according to the first embodiment. FIG. 10 is a sectional view along line X-X' of FIG. 9. FIG. 11 is a sectional view along line XI-XI' of FIG. 9.

As illustrated in FIG. 9, the wiring region WA of the substrate 21 has a trapezoidal shape that couples the peripheral region GA (and the detection region AA) to the coupling region CA. In other words, the sides of the wiring region WA at the outer ends in the first direction Dx are inclined with respect to the second direction Dy. The width in the first direction Dx of the side of the wiring region WA on the coupling region CA side is smaller than the width in the first direction Dx of the side of the wiring region WA on the peripheral region GA side (and the detection region AA side).

The coupling wires 17 in the wiring region WA are each linearly provided and are arrayed in the first direction Dx with a gap interposed therebetween. The coupling wires 17 extend along the second direction Dy at the center of the wiring region WA in the first direction Dx. The coupling wires 17 have a larger inclination angle with respect to the second direction Dy as closer to the outer ends of the wiring region WA in the first direction Dx. In other words, the arrangement pitch of the coupling wires 17 varies depending on the position in the second direction Dy. The arrangement pitch of the coupling wires 17 on the coupling region CA side is smaller than that of the coupling wires 17 on the peripheral region GA side (and the detection region AA side). The arrangement pitch of the coupling wires 17 arrayed in the first direction Dx is substantially constant at a predetermined position in the second direction Dy.

In the wiring region WA of the substrate 21, a plurality of through holes TH are formed between the coupling wires 17. The through holes TH are each have a circular shape. The through holes TH are formed corresponding to the respective coupling wires 17 in the first direction Dx. The through holes TH arrayed in the first direction Dx have the same diameter. The through holes TH are arrayed along the extending direction of the coupling wires 17. The through holes TH have a larger opening area (diameter) as the distance between the coupling wires 17 adjacently disposed in the first direction Dx is larger. In other words, the opening area (diameter) of the through holes TH is larger on the peripheral region GA side (and the detection region AA side) and is smaller on the coupling region CA side along the extending direction of the coupling wires 17.

The coupling wires 17 and the through holes TH are formed to be line-symmetric with respect to an axis of symmetry AX that passes through the center of the wiring region WA in the first direction Dx and is parallel to the second direction Dy.

As illustrated in FIG. 10, the insulating layer 23 is provided covering the coupling wires 17. The through holes TH pass through the substrate 21 and the insulating layer 23. In other words, the through holes TH open on the upper surface of the insulating layer 23 and on the lower surface of the substrate 21. As illustrated in FIG. 11, the substrate 21 and the insulating layer 23 are continuously provided between the coupling wires 17 at the part where the through holes TH are not formed.

As described above with reference to FIGS. 2 to 4, the detection region AA, the peripheral region GA, and the wiring region WA of the substrate 21 are provided to the curved surface of the housing 120 with the first direction Dx along the circumferential direction, and the coupling region CA is provided to the flat surface of the base 121. In this case, in the wiring region WA, compressive stress acts on the lower surface of the substrate 21 facing the outer peripheral surface of the housing 120 along the circumferential direction, and tensile stress acts on the upper surface of the insulating layer 23 on the opposite side. These stresses are relatively small at the center of the wiring region WA in the first direction Dx and become relatively larger toward the outer ends in the first direction Dx. This causes a stress distribution in the wiring region WA in the direction in which the coupling wires 17 are arrayed (first direction Dx).

The wiring region WA has a part that deforms along the outer peripheral surface of the housing 120 and a part flatly provided on the coupling region CA side. This causes a stress distribution in the wiring region WA also in the extending direction of the coupling wires 17 (second direction Dx).

The present embodiment can relieve the stress generated in the substrate 21 and the insulating layer 23 because the wiring region WA has a plurality of through holes TH. The substrate 21 and the insulating layer 23, for example, have flexibility in deformation at the part where the through holes TH are formed. When stress is generated in the substrate 21 and the insulating layer 23, the substrate 21 and the insulating layer 23 deform to reduce the stress. Therefore, the present embodiment can suppress the stress generated in the substrate 21 and the insulating layer 23 in the wiring region WA compared with the case where the through holes TH are not formed. As a result, the present embodiment can suppress breaking of the coupling wires 17 in the wiring region WA.

As described above, the through holes TH are arrayed in the direction in which the coupling wires 17 are arrayed (first direction Dx), thereby suppressing the stress in the wiring region WA in the direction in which the coupling wires 17 are arrayed (first direction Dx). In addition, the through holes TH are arrayed along the extending direction of the coupling wires 17, thereby also effectively suppressing the stress generated in the extending direction of the coupling wires 17.

Modifications

The shape, number, arrangement, and others of the through holes TH illustrated in FIG. 9 are given by way of example only and can be appropriately modified. The shape, number, arrangement, and others of the coupling wire 17 are given by way of example only and can be appropriately modified. In the following description, the same components as those described in the embodiment above are denoted by like reference numerals, and duplicate explanation thereof is omitted.

Figure 12:
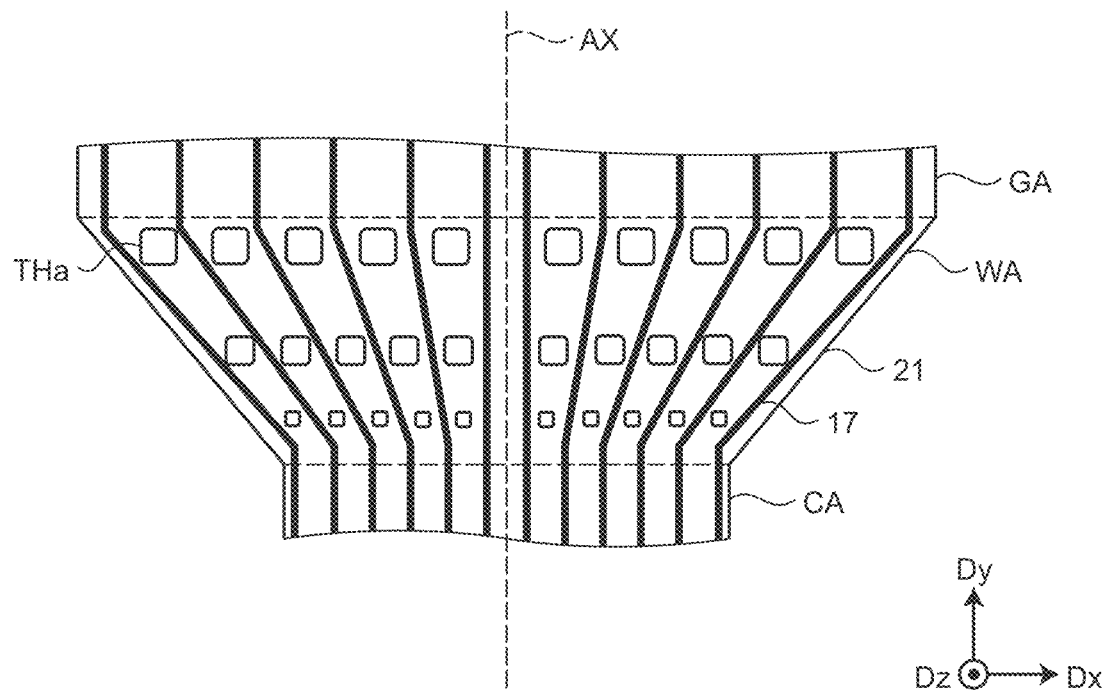
FIG. 12 is an enlarged plan view of a wiring region according to a first modification.
Figure 13:
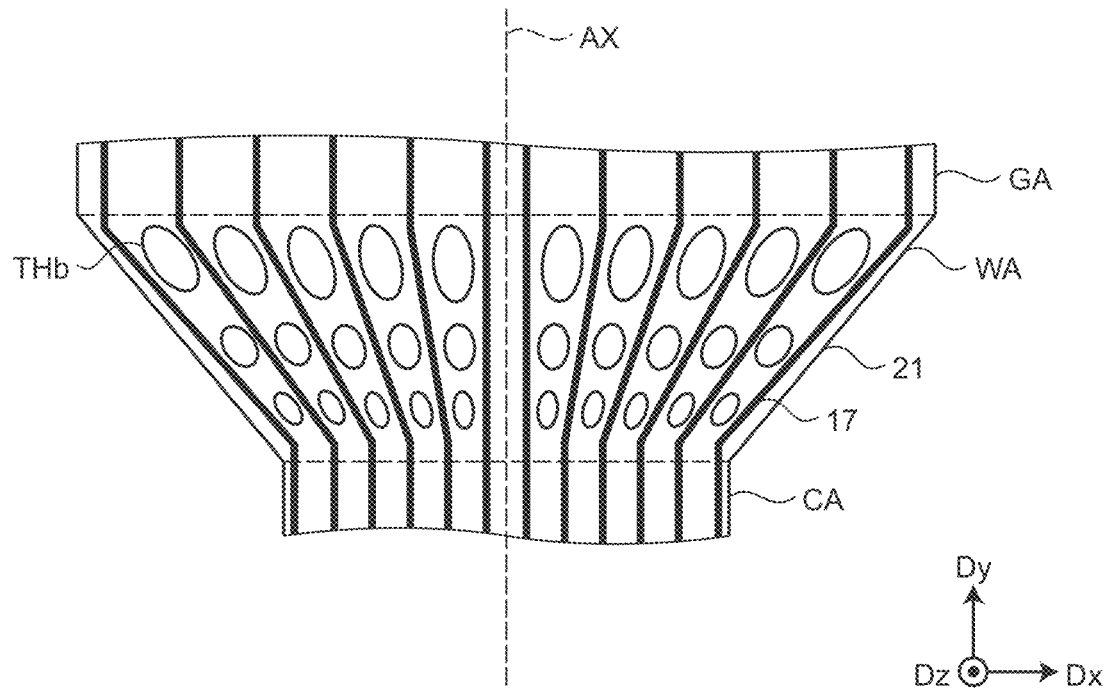
FIG. 13 is an enlarged plan view of a wiring region according to a second modification.

FIG. 12 is an enlarged plan view of a wiring region according to a first modification. FIG. 13 is an enlarged plan view of a wiring region according to a second modification. As illustrated in FIG. 12, a through hole THa according to the first modification has a rectangular shape. Alternatively, as illustrated in FIG. 13, a through hole THb according to the second modification has an elliptical shape. As described above, the shape of the through holes TH, THa, and THb can be appropriately modified. The through holes TH do not necessarily have the shapes in the examples according to the first and the second modifications and may have polygonal or other shapes. Alternatively, the through holes TH, THa, and THb having different shapes may be combined and formed in one wiring region WA.

Figure 14:
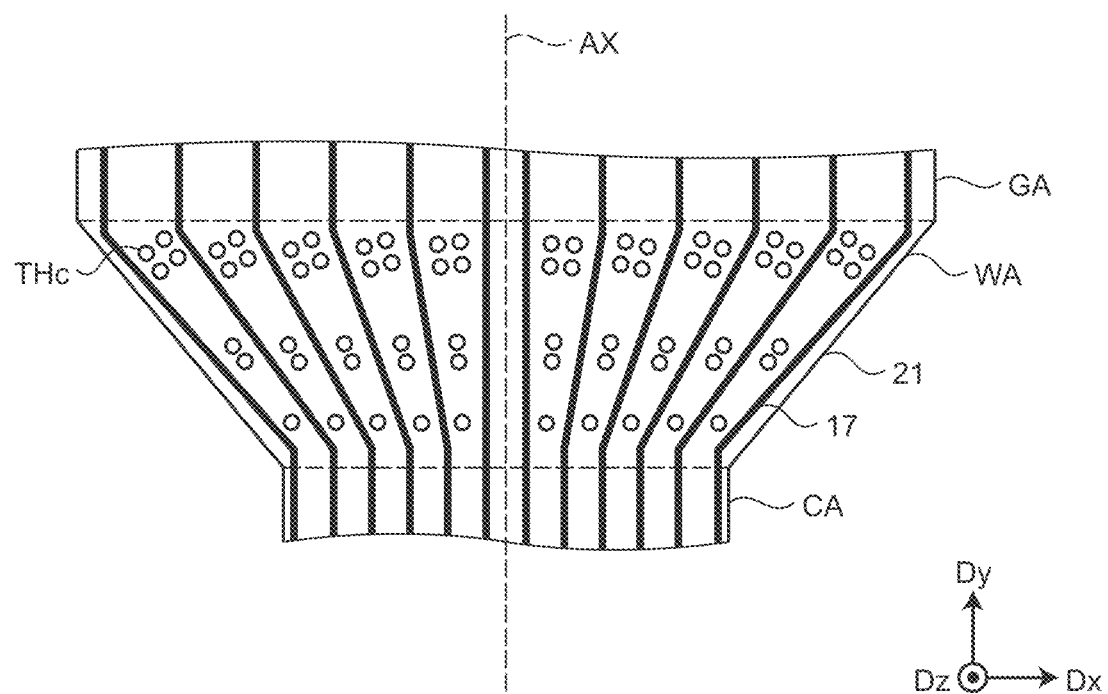
FIG. 14 is an enlarged plan view of a wiring region according to a third modification.

FIG. 14 is an enlarged plan view of a wiring region according to a third modification. As illustrated in FIG. 14, a plurality of through holes THc according to the third modification are arrayed along the extending direction of the coupling wires 17 and have the same shape and the same opening area (diameter). A larger number of through holes THc are formed as the distance between the coupling wires 17 adjacently disposed in the first direction Dx is larger. More precisely, the number of through holes THc per unit area is larger on the peripheral region GA side (and the detection region AA side) and is smaller on the coupling region CA side along the extending direction of the coupling wires 17.

In FIG. 14, four through holes THc are collectively formed between the adjacent coupling wires 17 on the peripheral region GA side (and the detection region AA side). Two through holes THc are collectively formed between the adjacent coupling wires 17 at the center in the extending direction of the coupling wires 17. One through hole THc is formed between the adjacent coupling wires 17 on the coupling region CA side. The number of through holes THc illustrated in FIG. 14 is given by way of example only and can be appropriately modified.

Figure 15:
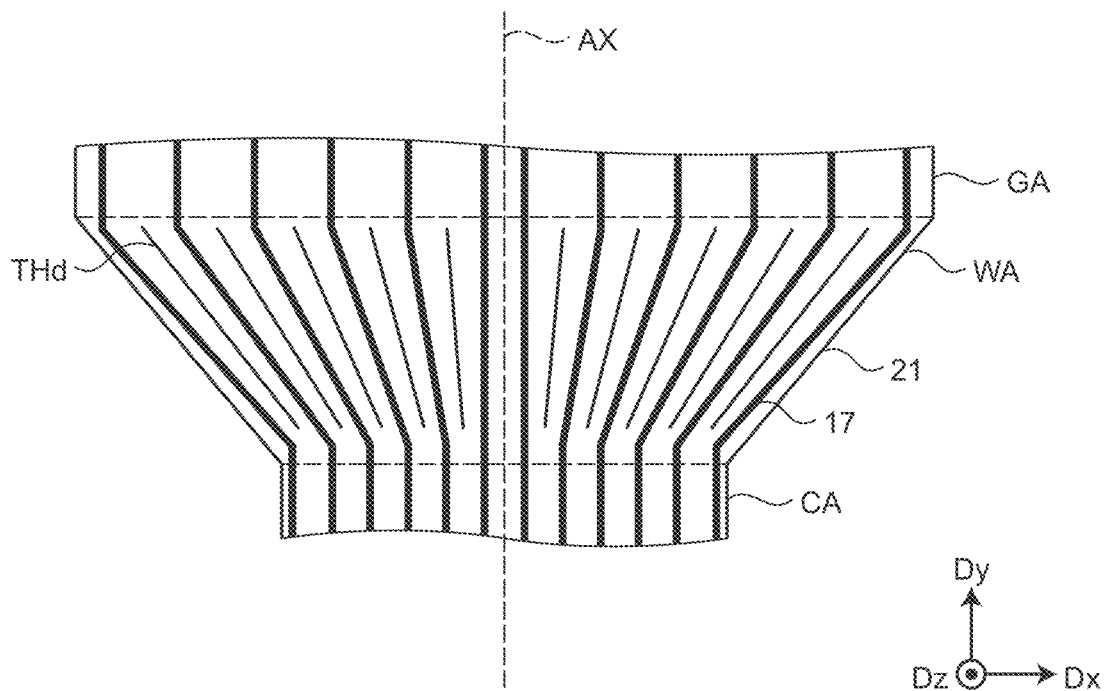
FIG. 15 is an enlarged plan view of a wiring region according to a fourth modification.

FIG. 15 is an enlarged plan view of a wiring region according to a fourth modification. As illustrated in FIG. 15, a through hole THd according to the fourth modification has a slit shape. The through hole THd extends along the extending direction of the coupling wires 17. In the fourth modification, one through hole THd is formed between the adjacent coupling wires 17. The number, shape, arrangement, and others of the slit-like through holes THd can be appropriately modified.

Figure 16:
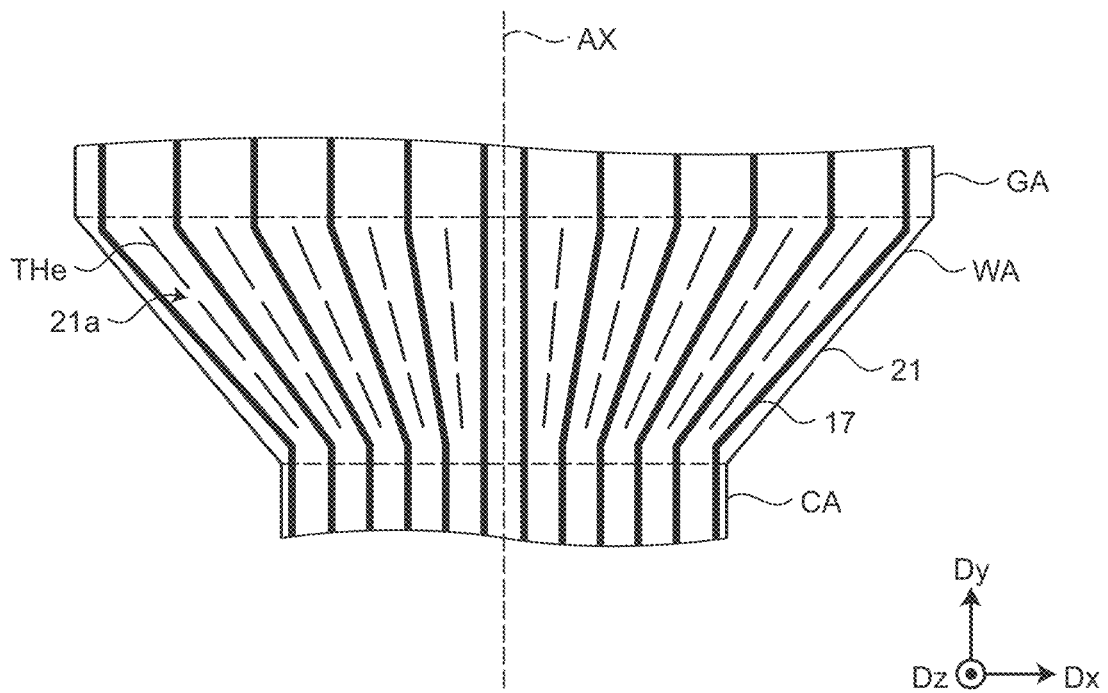
FIG. 16 is an enlarged plan view of a wiring region according to a fifth modification.

FIG. 16 is an enlarged plan view of a wiring region according to a fifth modification. As illustrated in FIG. 16, a plurality of through holes THe according to the fifth modification are arrayed along the extending direction of the coupling wires 17. The through holes THe are separated by a substrate 21a provided with no slit along the extending direction of the coupling wires 17. In FIG. 16, three through holes THe are formed between the coupling wires 17. The present modification is not limited thereto, and the number of through holes THe arrayed along the extending direction of the coupling wires 17 can be appropriately modified. The number of through holes THe may vary depending on the position in the first direction Dx.

Figure 17:
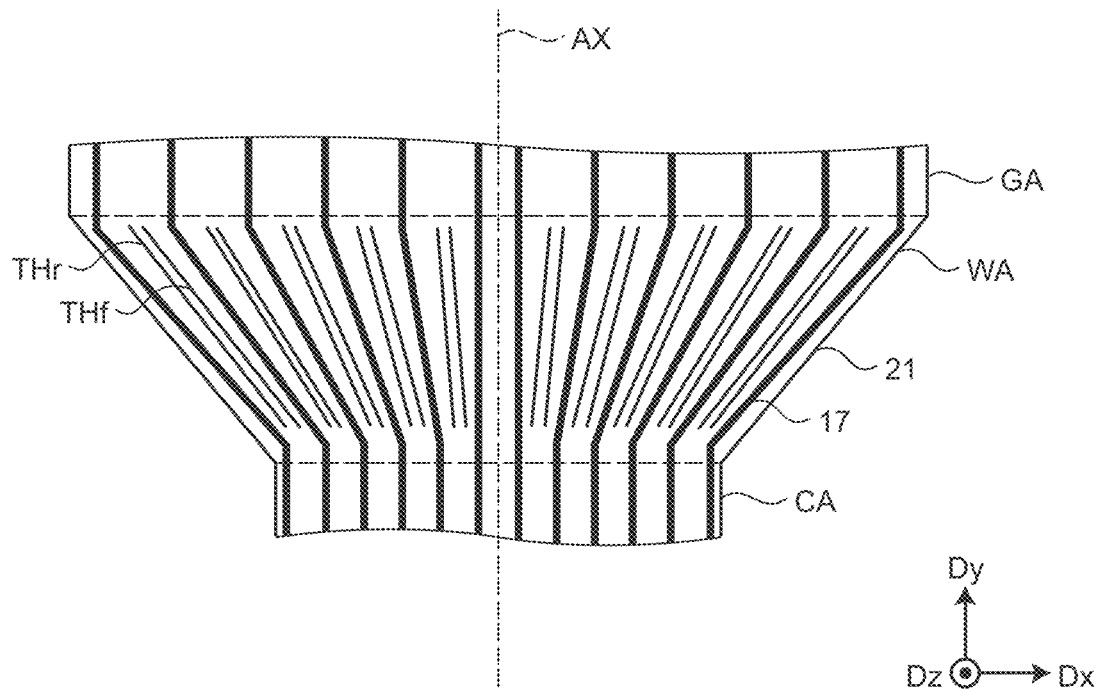
FIG. 17 is an enlarged plan view of a wiring region according to a sixth modification.

FIG. 17 is an enlarged plan view of a wiring region according to a sixth modification. As illustrated in FIG. 17, two through holes THf according to the sixth modification are formed side by side between the adjacent coupling wires 17. While two through holes THf are formed between the coupling wires 17 in FIG. 17, the number of through holes THf may be three or more. Alternatively, the number of through holes THf may vary depending on the position in the first direction Dx. For example, one through hole THf may be formed between the adjacent coupling wires 17 at the center of the wiring region WA in the first direction Dx, and the number of through holes THf may increase as closer to the outer ends of the wiring region WA in the first direction Dx.

Figure 18:
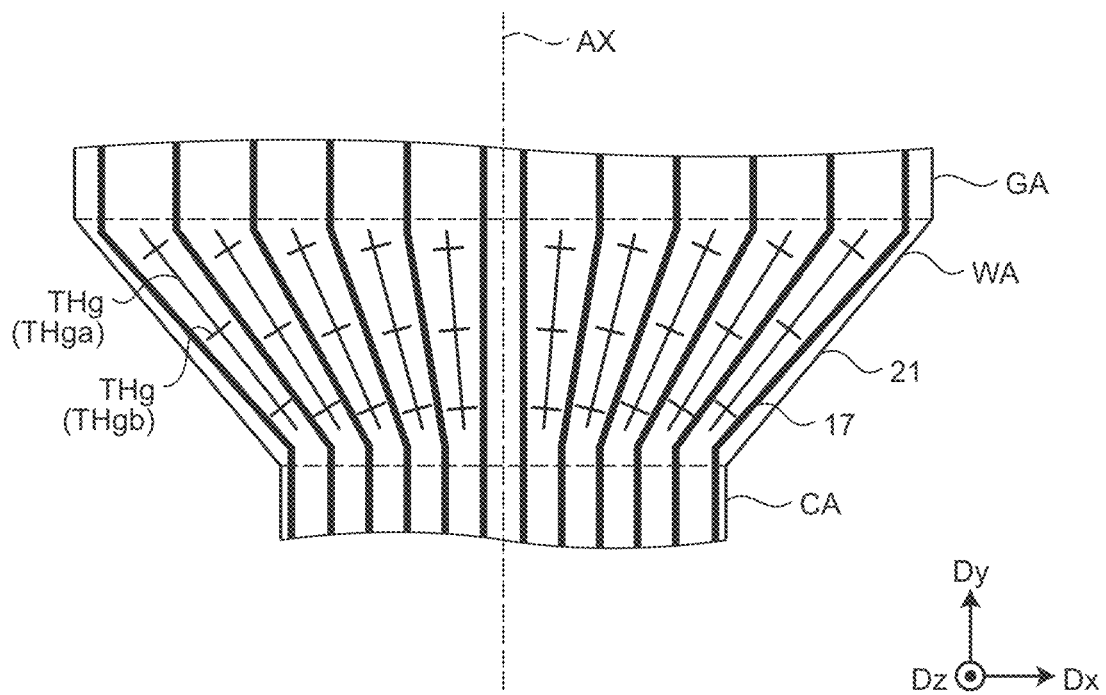
FIG. 18 is an enlarged plan view of a wiring region according to a seventh modification.

FIG. 18 is an enlarged plan view of a wiring region according to a seventh modification. As illustrated in FIG. 18, a through hole THg according to the seventh modification has a first slit portion THga and second slit portions THgb. The first slit portion THga extends along the extending direction of the coupling wires 17. The second slit portions THgb intersect the first slit portion THga. Three second slit portions THgb are formed corresponding to one first slit portion THga. The present modification is not limited thereto, and the number of second slit portions THgb formed corresponding to one first slit portion THga can be appropriately modified.

Figure 19:
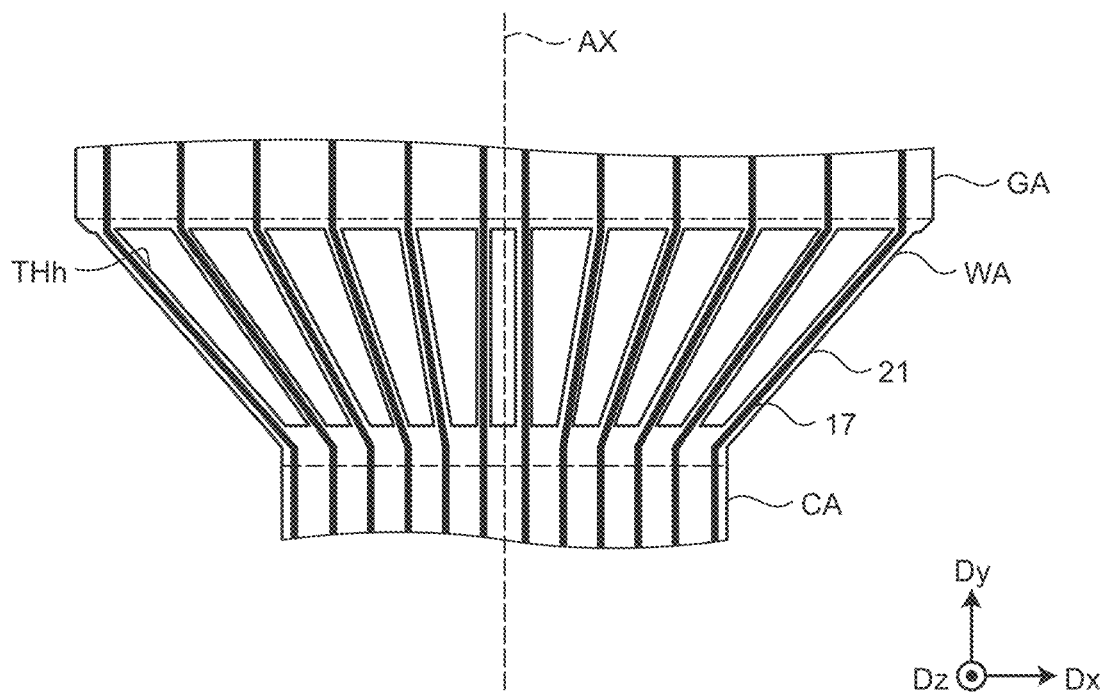
FIG. 19 is an enlarged plan view of a wiring region according to an eighth modification.

FIG. 19 is an enlarged plan view of a wiring region according to an eighth modification. As illustrated in FIG. 19, a through hole THh according to the eighth modification are formed to remove the substrate 21 and the insulating layer 23 in most regions between the adjacent coupling wires 17. In other words, the opening width of the through hole THh in the first direction Dx is substantially equal to the distance between the coupling wires 17 adjacently disposed in the first direction Dx. In one coupling wire 17, the width in the direction intersecting the extending direction of the coupling wire 17 is substantially equal to the width of the substrate 21 to which the coupling wire 17 is provided. The present modification can suppress the stress generated in the substrate 21 and increase the flexibility in deformation of each of the coupling wires 17 provided to the substrate 21.

Figure 20:
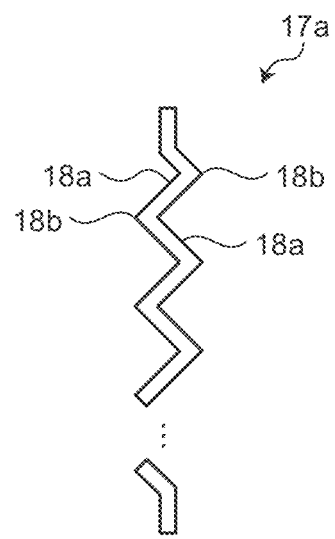
FIG. 20 is an enlarged plan view of a coupling wire in a wiring region according to a ninth modification.

FIG. 20 is an enlarged plan view of a coupling wire in a wiring region according to a ninth modification. As illustrated in FIG. 20, a coupling wire 17a according to the ninth modification has a zigzag line shape. More specifically, the coupling wire 17a has a plurality of linear portions 18a, and the linear portions 18a are coupled by bends 18b and extend in a zigzag line shape.

Figure 21:
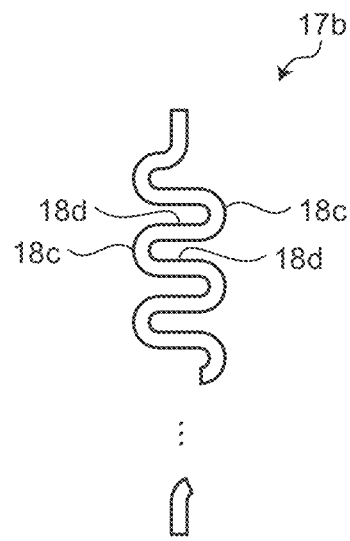
FIG. 21 is an enlarged plan view of a coupling wire in a wiring region according to a tenth modification.

FIG. 21 is an enlarged plan view of a coupling wire in a wiring region according to a tenth modification. As illustrated in FIG. 21, a coupling wire 17b according to the tenth modification has a meander shape. More specifically, the coupling wire 17b has a plurality of arc portions 18c and a plurality of linear portions 18d, and the arc portions 18c and the linear portions 18d are alternately coupled and extend in a meander shape.

Figure 22:
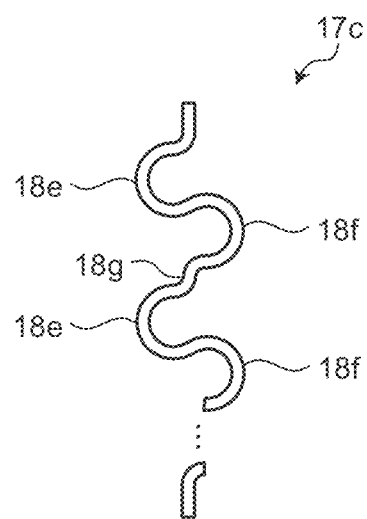
FIG. 22 is an enlarged plan view of a coupling wire in a wiring region according to an eleventh modification.

FIG. 22 is an enlarged plan view of a coupling wire in a wiring region according to an eleventh modification. As illustrated in FIG. 22, a coupling wire 17c according to the eleventh modification has a meander shape. More specifically, the coupling wire 17c has a plurality of arc portions 18e and 18f and a plurality of linear portions 18g. The arc portions 18e and 18f are connected in an S-shape, and the connected arc portions 18e and 18f are coupled by the linear portions 18g and extend in a meander shape.

While FIG. 20 (ninth modification) to FIG. 22 (eleventh modification) illustrate the single coupling wires 17a, 17b, and 17c, respectively, a plurality of coupling wires 17a, 17b, and 17c are arrayed in the wiring region WA as illustrated in FIG. 9 and other figures. The coupling wires 17a, 17b, and 17c described in the ninth to the eleventh modifications are applicable to the first embodiment and the first to the eighth modifications described above.

The linear coupling wire 17 and at least one of the coupling wires 17a, 17b, and 17c may be combined in one wiring region WA. For example, the linear coupling wire 17 may be provided at the center of the wiring region WA in the first direction Dx where the stress is relatively small, and the zigzag-line-shaped coupling wire 17a or the meander-shaped coupling wire 17b or 17c may be provided at the outer ends of the wiring region WA in the first direction Dx where the stress is relatively large. With this configuration, the detection device 1 can effectively suppress the stress acting on the coupling wire 17.

Figure 23:
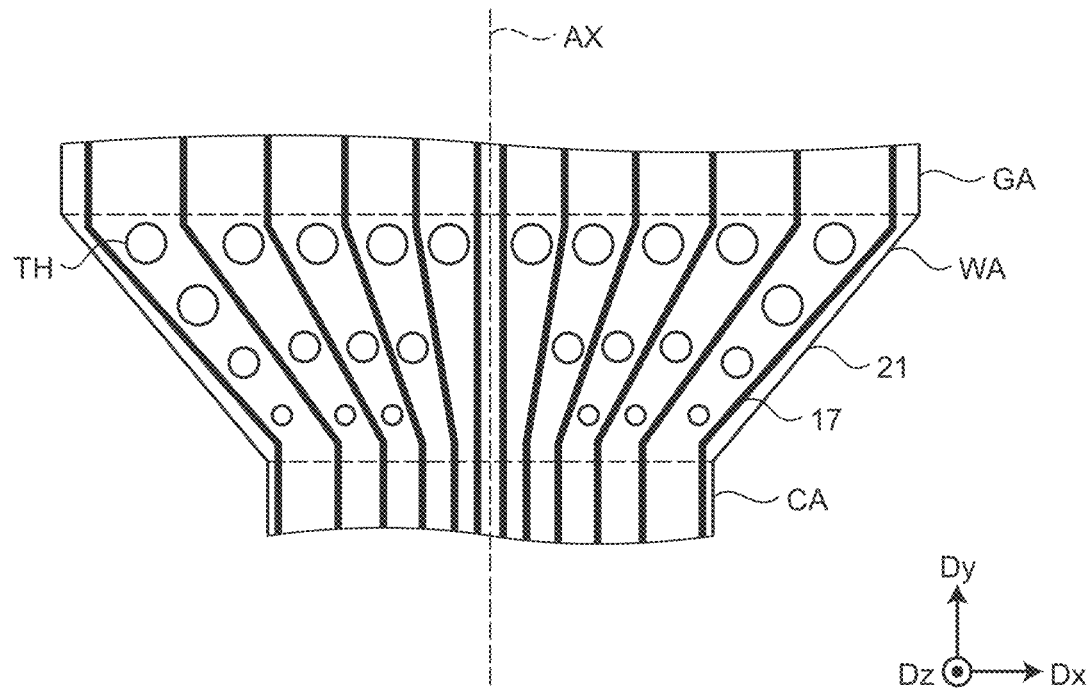
FIG. 23 is an enlarged plan view of a wiring region according to a twelfth modification.

FIG. 23 is an enlarged plan view of a wiring region according to a twelfth modification. As illustrated in FIG. 23, the distance between the coupling wires 17 adjacently disposed in the first direction Dx according to the twelfth modification is larger at the outer ends of the wiring region WA of the substrate 21 in the first direction Dx than at the center in the first direction Dx. In FIG. 23, the distance between the coupling wires 17 gradually increases from the center of the wiring region WA of the substrate 21 in the first direction Dx to the outer ends in the first direction Dx. The number of through holes TH formed between the coupling wires 17 adjacently disposed in the first direction Dx is larger at the outer ends of the wiring region WA of the substrate 21 in the first direction Dx than at the center of the wiring region WA in the first direction Dx.

In other words, the arrangement density of the coupling wires 17 is smaller at the outer ends of the wiring region WA of the substrate 21 in the first direction Dx than at the center of the wiring region WA in the first direction Dx. The arrangement density of the through holes TH is larger at the outer ends of the wiring region WA of the substrate 21 in the first direction Dx than at the center of the wiring region WA in the first direction Dx.

With this configuration, the twelfth modification can effectively relieve the stress generated in the substrate 21 and suppress the stress acting on the coupling wires 17 at the outer ends of the wiring region WA in the first direction Dx. The configuration illustrated in FIG. 23 can be combined with the first to the eleventh modifications described above.

Figure 24:
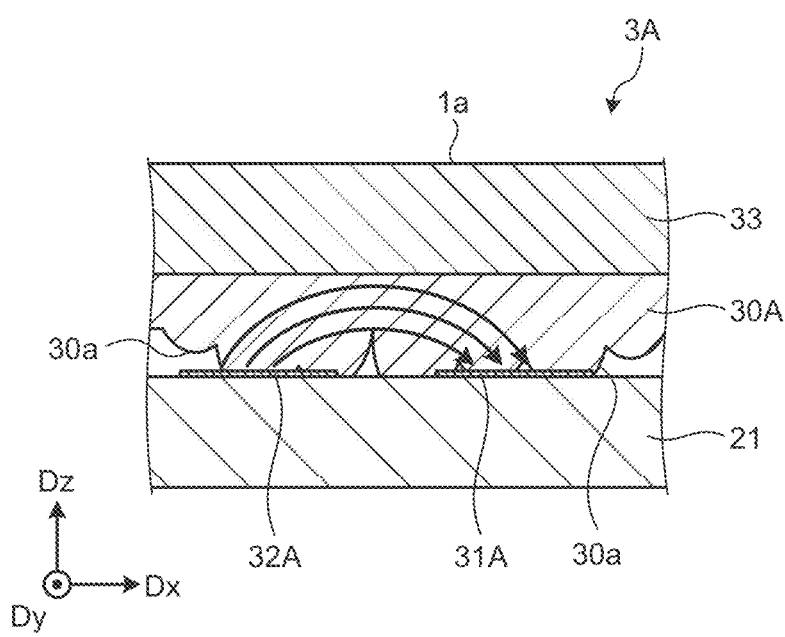
FIG. 24 is a sectional view of a force sensor according to a thirteenth modification including parallel electrodes.

FIG. 24 is sectional view of a force sensor according to a thirteenth modification including parallel electrodes. FIGS. 24 to 29 do not illustrate the circuit layer 55 (the drive transistor Tr and the insulating layer 23). As illustrated in FIG. 24, a force sensor 3A according to the thirteenth modification includes parallel electrodes in which a detection electrode 31A and a common electrode 32A are disposed on the same plane. With the parallel electrodes (the detection electrode 31A and the common electrode 32A), an electric current flows in the planar direction in a sensor layer 30A (refer to the arrows in FIG. 24). The detection electrode 31A and the common electrode 32A can have any planar shape. The detection electrode 31A and the common electrode 32A can have a comb shape, for example.

Figure 25:
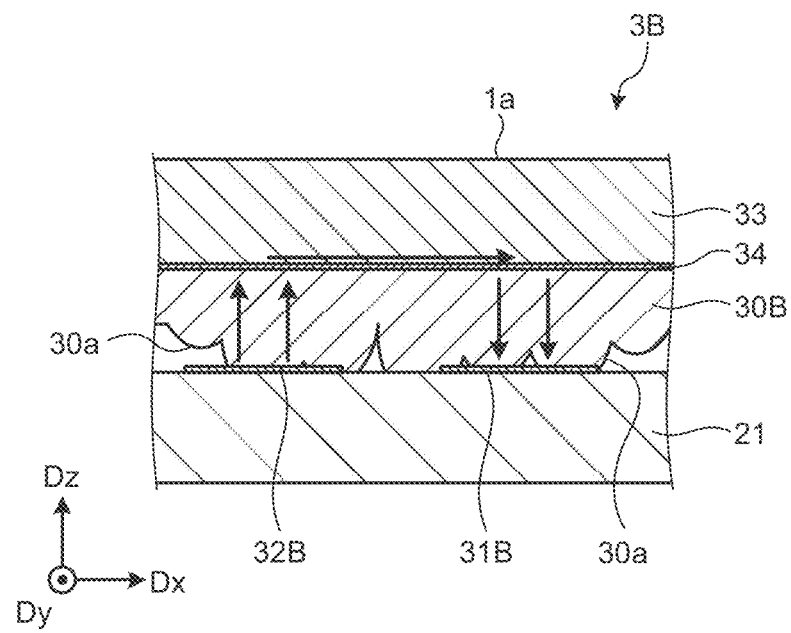
FIG. 25 is a sectional view of a force sensor according to a fourteenth modification including hybrid electrodes.

FIG. 25 is a sectional view of a force sensor according to a fourteenth modification including hybrid electrodes. As illustrated in FIG. 25, a force sensor 3B according to the fourteenth modification includes hybrid electrodes obtained by combining counter electrodes and parallel electrodes. In the hybrid electrodes, a detection electrode 31B and a common electrode 32B are disposed on the upper surface of the substrate 21. In addition, an intermediate electrode 34 is disposed on the lower surface of the protective layer 33. The intermediate electrode 34 faces the detection electrode 31B and the common electrode 32B.

When force is input to the force sensor 3B including the hybrid electrodes, an electric current first flows from the common electrode 32B to the intermediate electrode 34. The electric current then flows in the planar direction along the intermediate electrode 34. Subsequently, the electric current flows to the detection electrode 31B via a sensor layer 30B. The detection electrode 31B, the common electrode 32B, and the intermediate electrode 34 can have any planar shape. The detection electrode 31A and the common electrode 32A can have a comb shape, for example. The intermediate electrode 34 may be a solid film extending over the detection region AA.

Figure 26:
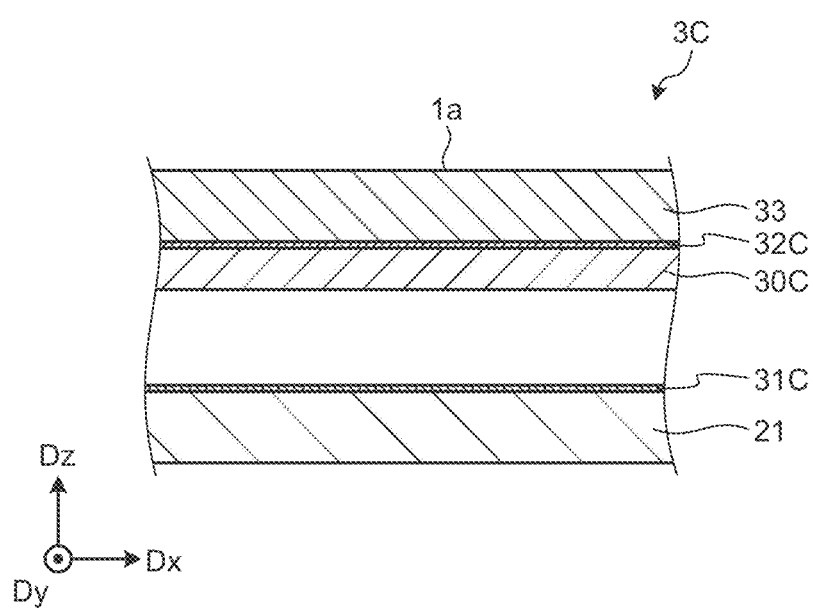
FIG. 26 is a sectional view of a force sensor according to a fifteenth modification before force is input.
Figure 27:
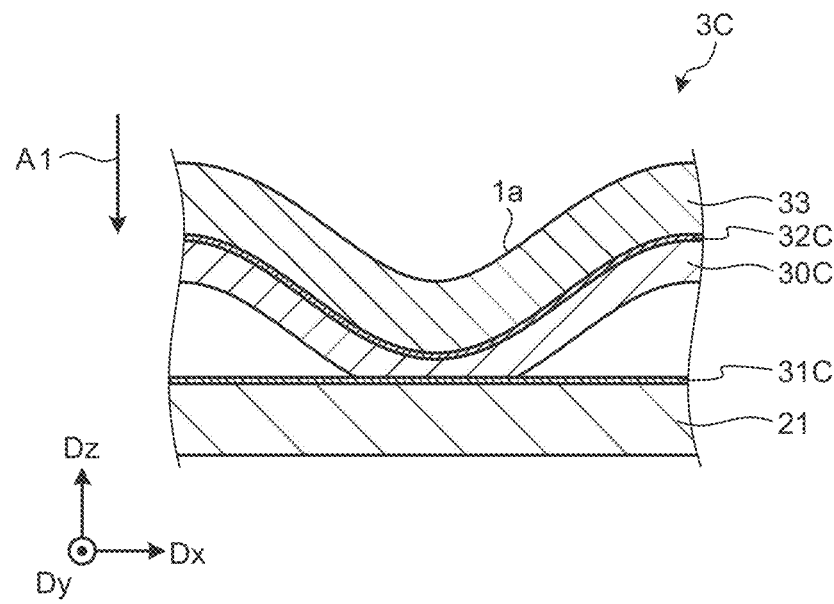
FIG. 27 is a sectional view of the force sensor according to the fifteenth modification after force is input.

FIG. 26 is a sectional view of a force sensor according to a fifteenth modification before force is input. FIG. 27 is a sectional view of the force sensor according to the fifteenth modification after force is input. As illustrated in FIG. 26, a sensor layer 30C of a force sensor 3C according to the fifteenth modification is provided on the lower surface (surface facing a detection electrode 31C) of a common electrode 32C. The sensor layer 30C is made of conductive resin. Unlike the sensor layers 30, 30A, and 30B described above, the sensor layer 30C does not have the protrusions 30a, and the surface facing the detection electrode 31C is flat. The sensor layer 30C faces the detection electrode 31C with a space interposed therebetween and is not in contact with the detection electrode 31C before force is input.

As illustrated in FIG. 27, when the force is input, the sensor layer 30C is deformed to be recessed in the force direction A1 and comes into contact with the detection electrode 31C. As a result, an electric current flows to the detection electrode 31C. As the force increases, and the contact area between the sensor layer 30C and the detection electrode 31C increases, the electric current flowing to the detection electrode 31C increases.

Figure 28:
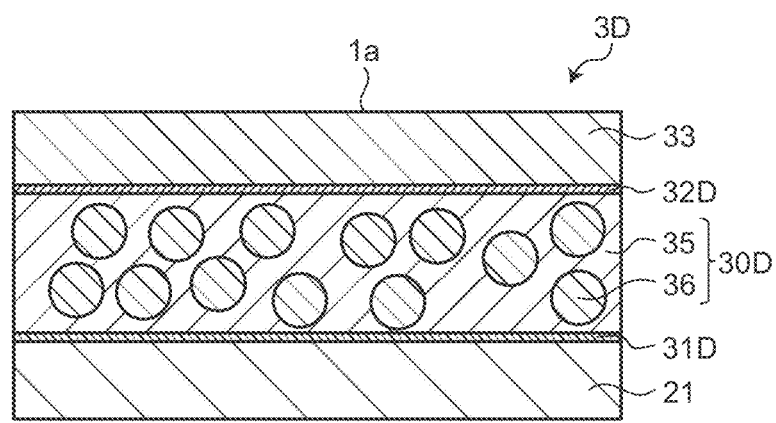
FIG. 28 is a sectional view of a force sensor according to a sixteenth modification before force is input.

FIG. 28 is a sectional view of a force sensor according to a sixteenth modification before force is input. FIG. 29 is a sectional view of the force sensor according to the sixteenth modification after force is input. As illustrated in FIG. 28, a sensor layer 30D of a force sensor 3D according to the sixteenth modification includes a resin layer 35 and conductive fillers 36 dispersed in the resin layer 35. The resin layer 35 of the sensor layer 30D is provided to fill the space between a detection electrode 31D and a common electrode 32D facing each other and is in contact with the detection electrode 31D and the common electrode 32D.

Most of the conductive fillers 36 of the sensor layer 30D are not in contact with the detection electrode 31D or the common electrode 32D before force is input. While some of the conductive fillers 36 are in contact with the detection electrode 31D and the common electrode 32D, no conductive path is formed between the detection electrode 31D and the common electrode 32D, and the detection electrode 31D and the common electrode 32D facing across the sensor layer 30D remain insulated.

As illustrated in FIG. 29, when the force is input, the protective layer 33 and the common electrode 32D move in the force direction A1, and the conductive fillers 36 of the sensor layer 30D come into contact with the detection electrode 31D and the common electrode 32D. The conductive fillers 36 themselves come into contact with each other. As a result, a conductive path is formed between the detection electrode 31D and the common electrode 32D, and an electric current flows to the detection electrode 31D. As the force increases, and the contact area between the conductive fillers 36 of the sensor layer 30D and the detection electrode 31D and the common electrode 32D increases, the electric current flowing to the detection electrode 31D increases.

Figure 30:
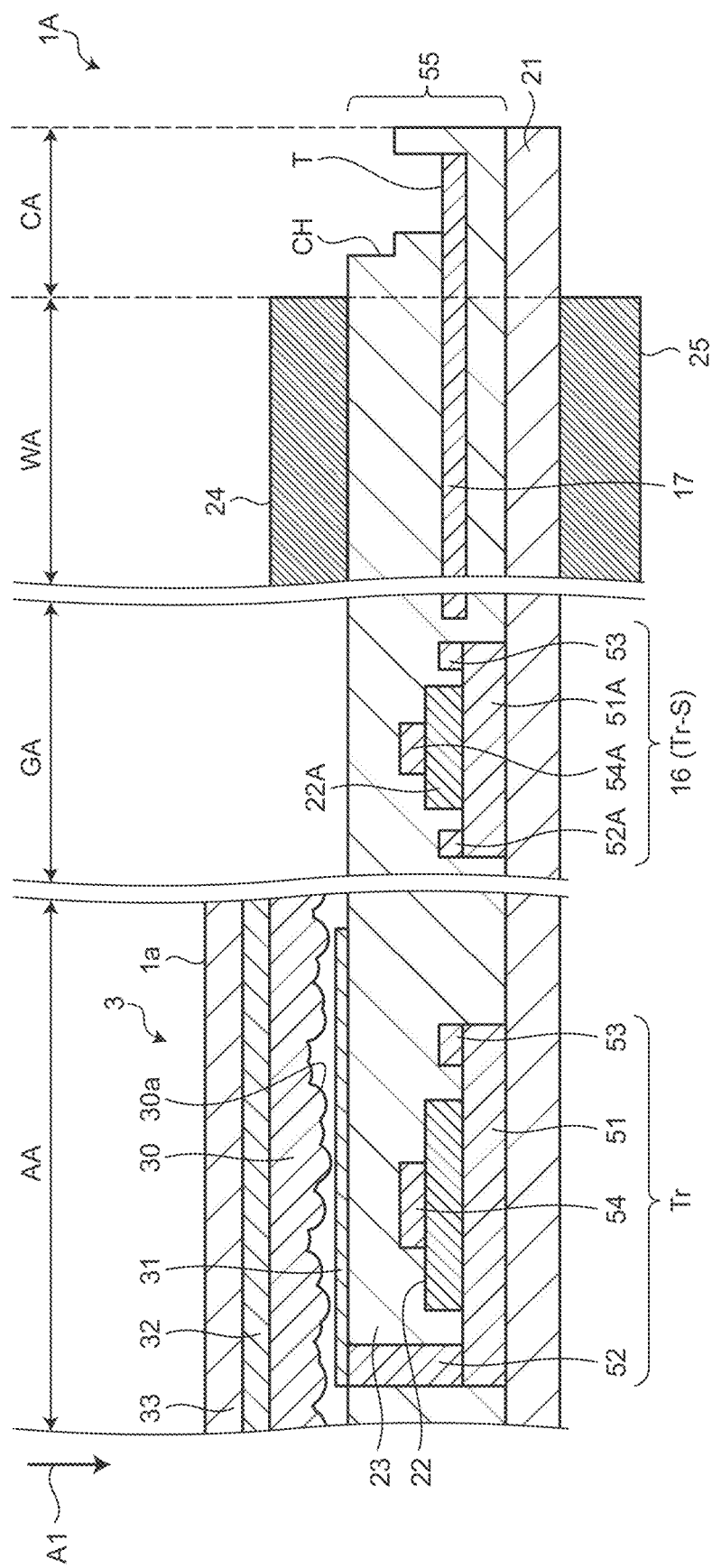
FIG. 30 is a sectional view of a detection device according to a seventeenth modification.

FIG. 30 is a sectional view of a detection device according to a seventeenth modification. As illustrated in FIG. 30, a detection device 1A according to the seventeenth modification includes resin layers 24 and 25 provided in the wiring region WA. The resin layers 24 and 25 are made of elastic resin material. The resin layer 24 is provided on the upper surface of the insulating layer 23 in the wiring region WA. The resin layer 25 is provided on the lower surface of the substrate 21 in the wiring region WA. In the force direction A1, the substrate 21, the coupling wire 17, and the insulating layer 23 are provided between the resin layer 24 and the resin layer 25.

The through holes TH, which are not illustrated in FIG. 30, are formed passing through the resin layers 24 and 25. With the elastic resin layers 24 and 25, the present modification can protect the coupling wire 17 while suppressing the stress generated in the wiring region WA. Both the resin layers 24 and 25 are not necessarily provided, and only one of them may be provided. While the resin layers 24 and 25 are provided only in the wiring region WA in FIG. 30, they may also be provided in part of the peripheral region GA and the coupling region CA.

Figure 31:
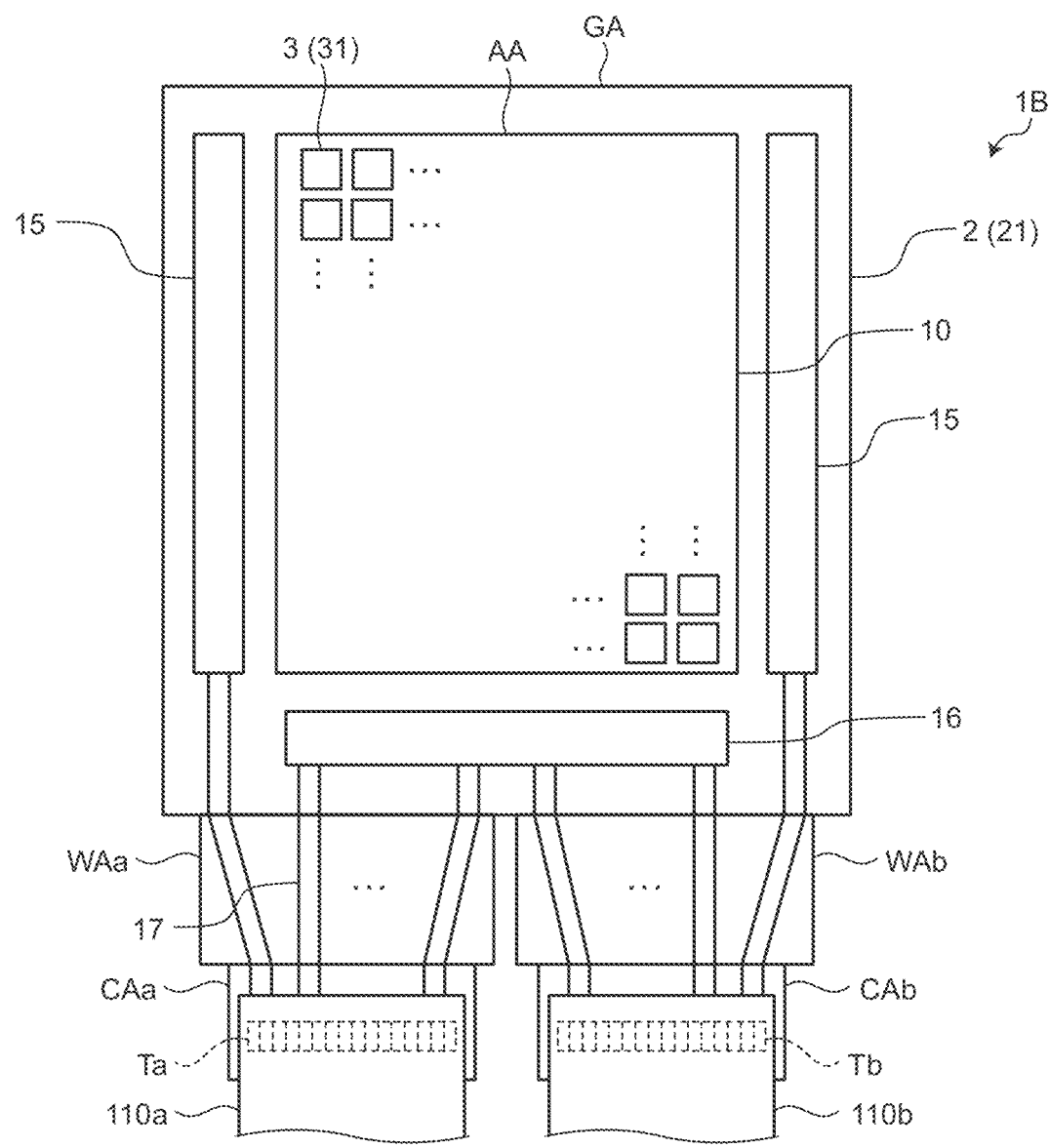
FIG. 31 is a plan view of a detection device according to an eighteenth modification.

FIG. 31 is a plan view of a detection device according to an eighteenth modification. As illustrated in FIG. 31, a detection device 1B according to the eighteenth modification has two wiring regions WAa and WAb and two coupling regions CAa and CAb. The two wiring regions WAa and WAb are provided to one side of the peripheral region GA and are disposed side by side in the first direction Dx with a gap interposed therebetween. The coupling regions CAa and CAb are coupled to the wiring regions WAa and WAb, respectively. The wiring region WAa according to the present modification is positioned between the coupling region CAa, and the detection region AA and the peripheral region GA in the second direction Dy. The wiring region WAb is positioned between the coupling region CAb, and the detection region AA and the peripheral region GA in the second direction Dy. The detection region AA, the peripheral region GA, the two wiring regions WAa and WAb, and the two coupling regions CAa and CAb are formed on the common substrate 21.

The coupling region CAa of the substrate 21 is coupled to a wiring substrate 110a via a plurality of terminals Ta. The coupling region CAb of the substrate 21 is coupled to a wiring substrate 110b via a plurality of terminals Tb. With this configuration, the detection device 1B according to the present modification can increase the flexibility in coupling with the external wiring substrates 110a and 110b. While the wiring substrates 110a and 110b are coupled to the coupling regions CAa and CAb, respectively, in this example, the present modification is not limited thereto. Alternatively, the drive IC 102 (refer to FIG. 1) may be mounted on at least one of the coupling regions CAa and CAb.

Figure 32:
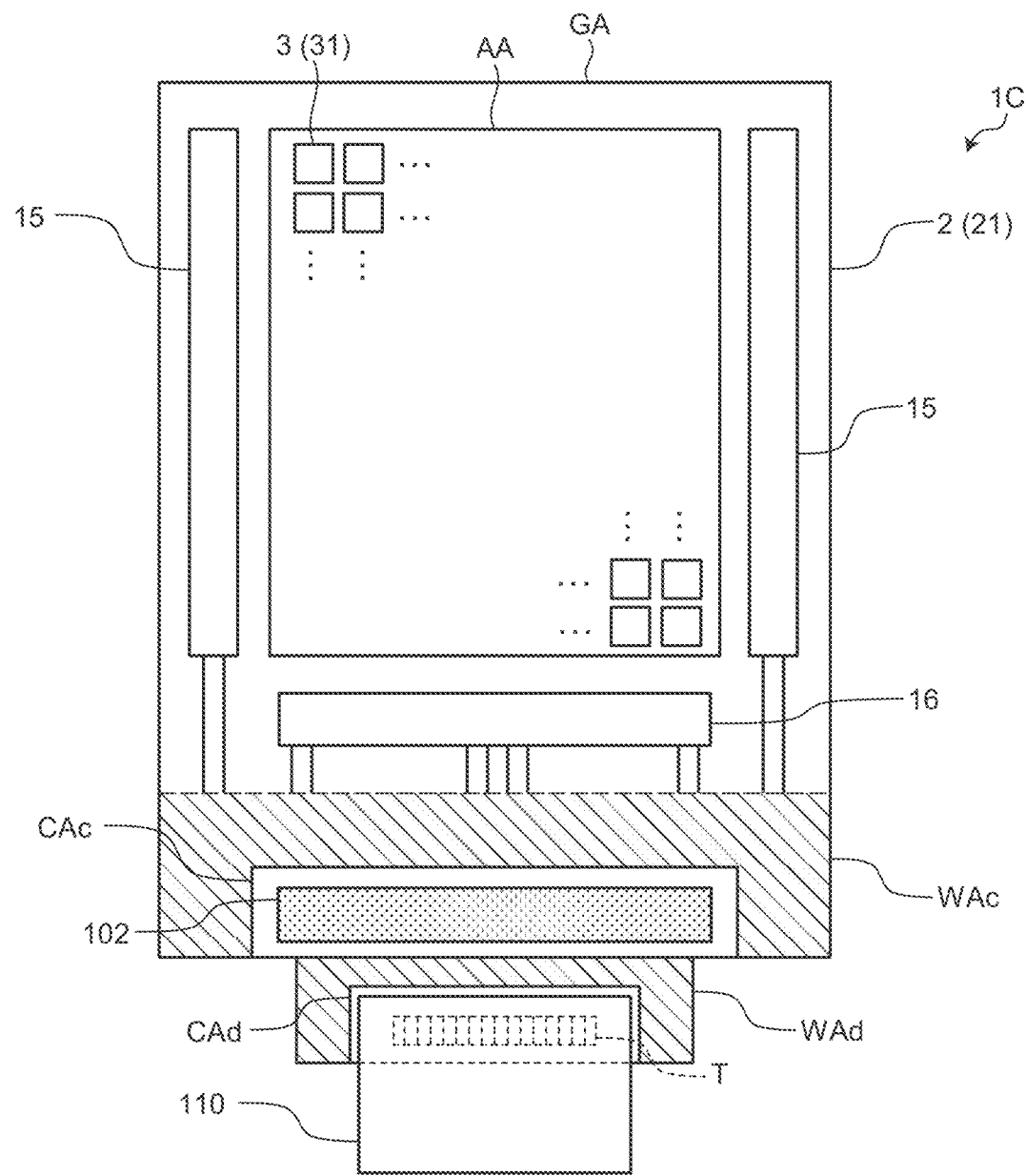
FIG. 32 is a plan view of a detection device according to a nineteenth modification.

FIG. 32 is a plan view of a detection device according to a nineteenth modification. As illustrated in FIG. 32, a detection device 1C according to the nineteenth modification has two wiring regions WAc and WAd and two coupling regions CAc and CAd. In FIG. 32, the wiring regions WAc and WAd are hatched to make the drawing easier to see.

The detection region AA and the peripheral region GA, the wiring region WAc, the coupling region CAc, the wiring region WAd, and the coupling region CAd are positioned in this order in the second direction Dy. In other words, the wiring region WAc is positioned between the coupling region CAc, and the detection region AA and the peripheral region GA in the second direction Dy. The wiring region WAc is also provided to the parts adjacent to the coupling region CAc in the first direction Dx. The drive IC 102 is mounted on the coupling region CAc.

The wiring region WAd is positioned between the coupling region CAc and the coupling region CAd in the second direction Dy. The wiring region WAd is also provided to the parts adjacent to the coupling region CAd in the first direction Dx. The coupling region CAd is coupled to the wiring substrate 110 via the terminals T. The width in the first direction Dx decreases in the order of the wiring region WAc, the coupling region CAc, the wiring region WAd, and the coupling region CAd.

Figure 33:
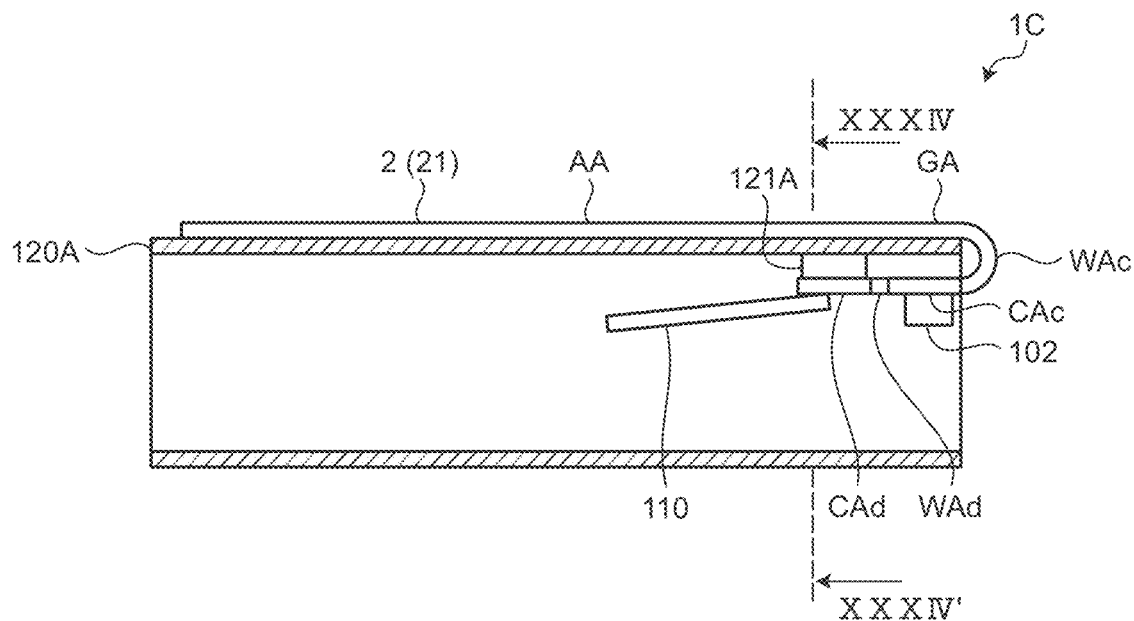
FIG. 33 is a plan view of an example of the use of the detection device according to the nineteenth modification.

FIG. 33 is a plan view of an example of the use of the detection device according to the nineteenth modification. As illustrated in FIG. 33, the detection device 1C according to the nineteenth modification is attached to a cylindrical housing 120A having a hollow shape. The detection region AA and the peripheral region GA of the substrate 21 are attached in a manner curved along the outer peripheral surface of the housing 120A.

The wiring region WAc of the substrate 21 is folded back at the opening end of the housing 120A. In other words, one end of the wiring region WAc is coupled to the peripheral region GA on the outer peripheral surface of the housing 120A, and the other end of the wiring region WAc is coupled to the coupling region CAc on the inner peripheral surface of the housing 120A. The coupling region CAc, the wiring region WAd, and the coupling region CAd of the substrate 21 are disposed inside the housing 120A. In other words, the drive IC 102 mounted on the coupling region CAc and the wiring substrate 110 coupled to the coupling region CAd are also disposed inside the housing 120A.

Figure 34:
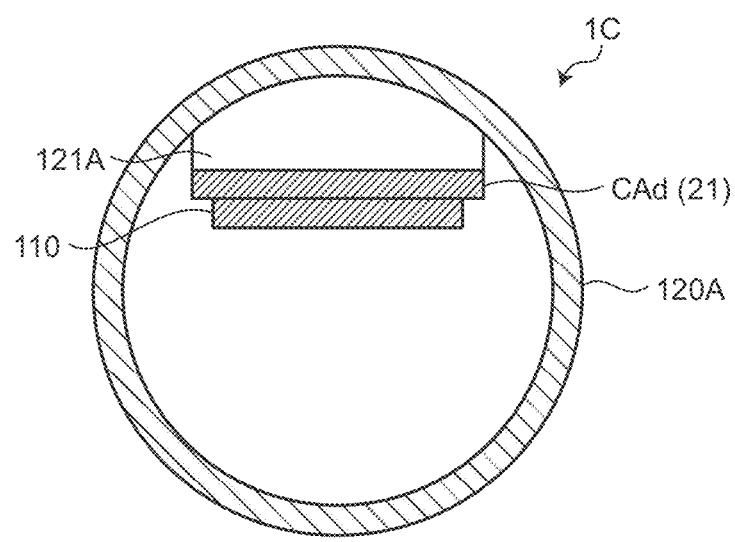
FIG. 34 is a sectional view along line XXXIV-XXXIV' of FIG. 33.

FIG. 34 is a sectional view along line XXXIV-XXXIV' of FIG. 33. As illustrated in FIG. 34, a base 121A is provided on the inner peripheral surface of the housing 120A. The coupling region CAd of the substrate 21 is attached on the flat surface of the base 121A. With this configuration, the coupling region CAd is provided on the inner peripheral surface of the housing 120 in a flat state, thereby securing satisfactory coupling with the wiring substrate 110.

Second Embodiment

Figure 35:
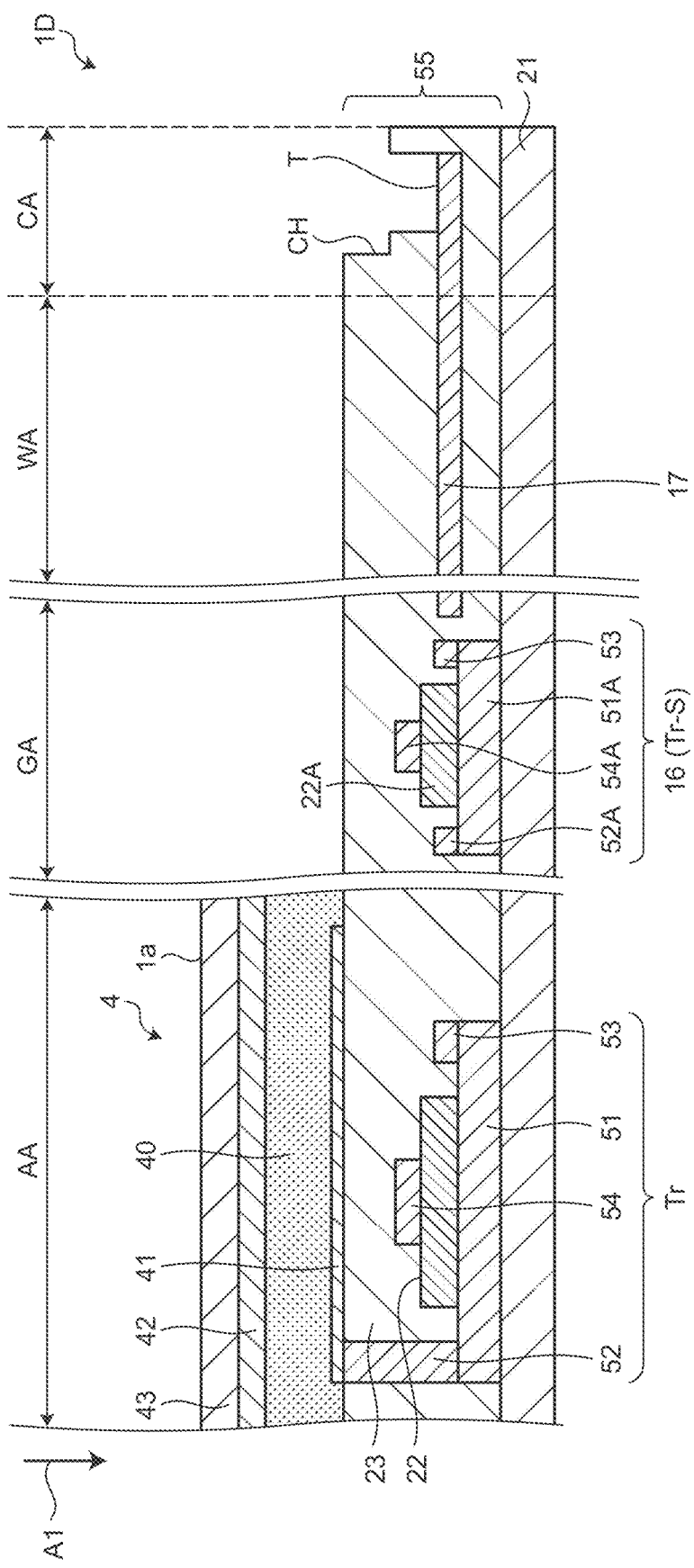
FIG. 35 is a sectional view of a detection device according to a second embodiment.

FIG. 35 is a sectional view of the detection device according to a second embodiment. While the first embodiment and the modifications described above include the force sensors 3 as the detection elements, for example, the detection elements are not limited to the force sensors 3. As illustrated in FIG. 35, a detection device 1D according to the second embodiment includes optical sensors 4 (detection elements) provided in the detection region AA to detect light incident on them. In the detection device 1D according to the second embodiment, the peripheral region GA, the wiring region WA, and the coupling region CA can employ the configurations described in the first embodiment and the modifications.

The optical sensor 4 is provided on the insulating layer 23 of the circuit layer 55. The optical sensor 4 includes a sensor layer 40, a detection electrode 41, and a common electrode 42. At least one of the detection electrode 41 and the common electrode 42 is made of translucent conductive material, such as indium tin oxide (ITO). The sensor layer 40 is made of photoelectric conversion material. The sensor layer 40 is an organic optical sensor composed of an electron transport layer, a light emission layer, and a hole transport layer, for example. Alternatively, the sensor layer 40 may be a positive intrinsic negative (PIN) photodiode formed by a semiconductor layer, such as silicon.

A protective layer 43 is provided covering the common electrode 42. Light from the outside is transmitted from the upper surface of the protective layer 43, that is, the input surface 1a to the sensor layer 40 of the optical sensor 4.

A plurality of optical sensors 4 are arrayed in a matrix (row-column configuration) in the detection region AA in plan view, which is not illustrated. The detection electrodes 41 are arrayed in a matrix (row-column configuration) in the detection region AA in plan view and are separated from each other corresponding to the respective optical sensors 4. The common electrode 42 is provided over the entire surface of the detection region AA to cover the optical sensors 4.

Similarly to the first embodiment and the modifications, the detection device 1D according to the present embodiment is used by being attached to the solid housing 120 or the hollow cylindrical housing 120A. The detection device 1D can be used for pulse measurement and vein authentication in a gripping state where an object to be detected grips the housing 120 or 120A.

While exemplary embodiments according to the present invention have been described, the embodiments are not intended to limit the invention. The contents disclosed in the embodiments are given by way of example only, and various modifications may be made without departing from the spirit of the present invention. Appropriate modifications made without departing from the spirit of the present invention naturally fall within the technical scope of the invention. At least one of various omissions, substitutions, and modifications of the components may be made without departing from the gist of the embodiments and the modifications described above.

What is claimed is:

1. A detection device comprising:
   a substrate having a detection region, a coupling region, and a wiring region between the detection region and the coupling region;
   a plurality of sensors disposed in the detection region of the substrate;
   a plurality of terminals disposed in the coupling region of the substrate and electrically coupled to the sensors;
   a plurality of coupling wires arranged with a gap interposed therebetween in the wiring region of the substrate and electrically coupling the sensors to the terminals;
   an insulating layer provided to the wiring region of the substrate and covering the coupling wires; and
   a plurality of through holes formed in the wiring region of the substrate, the through holes passing through from an upper surface of the insulating layer to a lower surface of the substrate, in a thickness direction between the coupling wires.

2. The detection device according to claim 1, further comprising:
   a housing having a curved surface; and
   a base provided to the housing and having a flat surface, wherein
   the detection region and the wiring region of the substrate are provided to the curved surface of the housing, and
   the coupling region is provided to the flat surface of the base.

3. The detection device according to claim 1, wherein the through holes are arrayed along an extending direction of the coupling wires.

4. The detection device according to claim 1, wherein the through holes have a larger opening area as the distance between the coupling wires adjacently disposed is larger.

5. The detection device according to claim 1, wherein a larger number of the through holes are formed as the distance between the coupling wires adjacently disposed is larger.

6. The detection device according to claim 1, wherein the through holes have a circular, elliptical, or rectangular shape.

7. The detection device according to claim 1, wherein the through holes have a slit shape.

8. The detection device according to claim 1, wherein
   the through holes have a slit shape, and
   the through holes each comprise:
   a first slit portion extending along an extending direction of the coupling wires; and
   a second slit portion intersecting the first slit portion.

9. The detection device according to claim 1, wherein
   the coupling wires are adjacently disposed in a first direction with a gap interposed therebetween, and
   an opening width of the through holes in the first direction is substantially equal to the distance between the coupling wires adjacently disposed in the first direction.

10. The detection device according to claim 1, wherein the coupling wires have a meander shape or a zigzag line shape.

11. The detection device according to claim 1, wherein
    the coupling wires are arranged in a first direction with a gap interposed therebetween, and
    the distance between the coupling wires adjacently disposed in the first direction is larger at an outer end of the wiring region of the substrate in the first direction than at a center of the wiring region in the first direction.

12. The detection device according to claim 1, wherein
    the coupling wires are adjacently disposed in a first direction with a gap interposed therebetween, and
    the number of the through holes formed between the coupling wires adjacently disposed in the first direction is larger at an outer end of the wiring region of the substrate in the first direction than at a center of the wiring region in the first direction.

13. The detection device according to claim 1, wherein the sensors are force sensors configured to detect force applied to the force sensors.

14. The detection device according to claim 1, wherein the sensors are optical sensors configured to detect light incident on the optical sensors.

* * * * *